(12) United States Patent
Li et al.

(10) Patent No.: US 12,036,581 B1
(45) Date of Patent: Jul. 16, 2024

(54) TANDEM METHODS AND DEVICES FOR SEPARATING COAL AND GANGUE BASED ON VISIBLE LIGHT AND X-RAYS

(71) Applicant: ANHUI UNIVERSITY OF SCIENCE AND TECHNOLOGY, Anhui (CN)

(72) Inventors: Xing Li, Huainan (CN); Jianqiang Yin, Huainan (CN); Hongzheng Zhu, Huainan (CN); Jinbo Zhu, Huainan (CN); Yong Zhang, Huainan (CN); Zhonglin Gao, Huainan (CN)

(73) Assignee: ANHUI UNIVERSITY OF SCIENCE AND TECHNOLOGY, Huainan (CN)

( * ) Notice: Subject to any disclaimer, the term of this patent is extended or adjusted under 35 U.S.C. 154(b) by 0 days.

(21) Appl. No.: 18/415,603

(22) Filed: Jan. 17, 2024

Related U.S. Application Data

(63) Continuation-in-part of application No. PCT/CN2023/125411, filed on Oct. 19, 2023.

(30) Foreign Application Priority Data

Feb. 28, 2023 (CN) .......................... 202310196429.1

(51) Int. Cl.
  *B07C 5/342* (2006.01)
  *G01N 21/01* (2006.01)
(52) U.S. Cl.
  CPC ........... *B07C 5/3427* (2013.01); *G01N 21/01* (2013.01); *G01N 2021/0181* (2013.01)
(58) Field of Classification Search
  CPC ...................... B07C 5/3437; G01N 2021/0181
  (Continued)

(56) References Cited

U.S. PATENT DOCUMENTS

2012/0165973 A1 6/2012 Earlam
2019/0358677 A1 11/2019 Roos et al.
(Continued)

FOREIGN PATENT DOCUMENTS

CN 105562366 A 5/2016
CN 105944976 A 9/2016
(Continued)

OTHER PUBLICATIONS

First Office Action in Chinese Application No. 202310196429.1 mailed on Feb. 21, 2024, 19 pages.
(Continued)

*Primary Examiner* — Michael McCullough
*Assistant Examiner* — Molly K Devine
(74) *Attorney, Agent, or Firm* — PORUS IP LLC

(57) ABSTRACT

Tandem methods and devices for separating coal and gangue based on visible light and an X-ray are provided. The method comprises: determining, based on a visible light image, an image feature set and a target region of coal gangue; recognizing the coal gangue and removing large gangue in the coal gangue; performing imaging on the coal gangue after the large gangue is removed; extracting a target image and determining a gray scale value of the target image; obtaining samples of coal and gangue of different granularity levels by performing sampling; establishing a database and obtaining a separation threshold of coal and gangue of each granularity level of the current mining area; forming a mapping set and storing the database in a storage space; and obtaining a gray scale value of subsequent coal gangue, importing the gray scale value of the subsequent coal gangue into the mapping set to subsequently separate coal and gangue.

8 Claims, 8 Drawing Sheets

(58) Field of Classification Search
USPC .............................................................. 209/4
See application file for complete search history.

(56) References Cited

U.S. PATENT DOCUMENTS

| | | |
|---|---|---|
| 2020/0384506 A1 | 12/2020 | Hunt et al. |
| 2022/0390390 A1 | 12/2022 | Kolacz |

FOREIGN PATENT DOCUMENTS

| | | |
|---|---|---|
| CN | 108564108 A | 9/2018 |
| CN | 109877055 A | 6/2019 |
| CN | 209968945 U | 1/2020 |
| CN | 113399108 A | 9/2021 |
| CN | 113458005 A | 10/2021 |
| CN | 113828531 A | 12/2021 |
| CN | 114101081 A | 3/2022 |
| CN | 114515705 A | 5/2022 |
| CN | 114519377 A | 5/2022 |
| CN | 114627109 A | 6/2022 |
| CN | 114689621 A | 7/2022 |
| CN | 114972922 A | 8/2022 |
| CN | 116159773 A | 5/2023 |

OTHER PUBLICATIONS

Yang, Huigang, A Research on the Separation of Coal and Gangue System based on X-ray and Matchine Vision, Collection I of Engineering Technology of China Master's Theses Full-text Database of CNKI, 2018, 86 pages.

International Search Report in PCT/CN2023/125411 mailed on Dec. 15, 2023, 11 pages.

Written Opinion in PCT/CN2023/125411 mailed on Dec. 15, 2023, 9 pages.

410-Isolated lead plate;
421-Feeding conveyor belt;
422-Transition conveyor belt;
423-Coal discharging conveyor belt;
424-Gangue discharging conveyor belt;
430-Industrial visible light camera;
440-X-ray source;
450-Removal device;
451-First removal device;
452-Second removal device;
460-Processor;
470-Storage space;

510-Industrial visible light camera;
520-Isolated lead plate;
530-Feeding conveyor belt;
540-Transition conveyor belt;
550-Coal discharging conveyor belt;
560-X-ray detector;
571-First air nozzle;
572-Second air nozzle;
580-Gangue discharging conveyor belt;
590-Auxiliary rollers

TANDEM METHODS AND DEVICES FOR SEPARATING COAL AND GANGUE BASED ON VISIBLE LIGHT AND X-RAYS

CROSS-REFERENCE TO RELATED APPLICATION

This application is a Continuation-in-part of International Application No. PCT/CN2023/125411, filed on Oct. 19, 2023, which claims priority to Chinese Patent Application No. 202310196429.1, filed on Feb. 28, 2023, the entire contents of each of which are hereby incorporated by reference.

TECHNICAL FIELD

The present disclosure relates to the field of coal and gangue separation technology, and in particular, to tandem methods and devices for separating coal and gangue based on visible light and an X-ray.

BACKGROUND

Gangue, as an unavoidable accompanying product in the process of coal mining, has a great impact on the quality of coal, which is mainly reflected in the combustion of coal and subsequent coal handling, etc. With the development of the times, more and more attention is paid to clean and efficient utilization of coal. Efficient separation of gangue from the source is an essential part.

Previously, the technology of coal gangue separation mainly includes artificial separation, wet separation, and traditional dry separation. The manual separation has problems such as a need for a lot of labor or a dusty working environment, which is used less at present. The wet separation has a problem such as the need to consume a lot of water, and the wet separation cannot be used to separate lignite with many constraints. The traditional dry separation uses wind power, which has a relatively lower separation accuracy and efficiency and relatively high requirements for supporting facilities. Due to the arrival of the information age, the photoelectric sorting technology gradually emerges, and the coal gangue separation technology of the visible light sorting and X-ray sorting gradually appears. Even with the visible light sorting and X-ray sorting technology, there are still the following problems. First, the visible light sorting will be affected by the dust and moisture on a surface of the coal gangue, and it is difficult to recognize gangue with a relatively small granularity. Moreover, the invisible light sorting (i.e., X-ray sorting) will be affected by a granularity of the coal gangue. An attenuation degree of coal and gangue of a large granularity is not obvious after X-rays are penetrated. The gangue of a large granularity is relatively difficult to be recognized.

Therefore, it is desirable to provide tandem methods and devices for separating coal and gangue based on visible light and an X-ray, which not only covers all granularities of coal and gangue but also ensures accurate sorting function of coal and gangue of each granularity.

SUMMARY

One or more embodiments of the present disclosure provide a tandem method for separating coal and gangue based on visible light and an X-ray. The method is executed by a processor and the method comprises: S1, obtaining a visible light image by an industrial visible light camera taking coal gangue;

S2, extracting an image feature set of the coal gangue of a plurality of scales based on processing of the visible light image by a back-end personal computer (PC); and performing multi-level processing on the visible light image entering the PC based on a first preset algorithm, the first preset algorithm including:

$$K_{l+1}(i, j) = \sum\nolimits_{m=-2}^{2} \sum\nolimits_{n=-2}^{2} p(m, n) K_l(2i - m, 2i - n),$$

where $K_l(*)$ denotes an $l^{th}$ image, $K_{l+1}(*)$ denotes a $(l+1)^{th}$ image, p(m,n) denotes a 5×5 pixel window function with a low-pass filter property as a Gaussian convolution kernel, m denotes a function value in an x-axis direction in a Gaussian convolution kernel window, n denotes a function value in a y-axis direction in the Gaussian convolution kernel window, and i and j denote pixel values on the x-axis and the y-axis of the image;

S3, determining a target region through a central region proposal network based on the visible light image;

S4, recognizing the coal gangue based on a convolutional neural network (CNN) model and sending a first separation instruction to a first air nozzle to control the first air nozzle to remove large gangue in the coal gangue;

S5, performing imaging on the coal gangue after the large gangue is removed based on an X-ray source;

S6, extracting a target image based on the PC and determining a gray scale value corresponding to the target image, the target image including a high-energy imaging image and a low-energy imaging image;

S7, obtaining samples of coal and gangue of different granularity levels by performing sampling based on a coal quality of a current mining area; obtaining an image gray scale value of each sample of coal and gangue based on the step S5 and the step S6, establishing a database, and obtaining a separation threshold of coal and gangue of each granularity level of the current mining area by performing statistics; and matching, based on the separation threshold, the image gray scale value of the sample of the coal and gangue to form a mapping set, and storing the database in a storage space; and S8, removing the large gangue through the first air nozzle by executing the steps S1-S4, obtaining a gray scale value of subsequent coal gangue by executing the step S5 and the step S6, importing the gray scale value of the subsequent coal gangue into the mapping set of the step S7, and sending a second separation instruction to a second air nozzle to control the second air nozzle to subsequently separate coal and gangue.

One or more embodiments of the present disclosure provide a tandem device for separating coal and gangue based on visible light and an X-ray using the tandem method for separating coal and gangue based on visible light and an X-ray. The device includes an isolated lead plate. A hollow inner cavity of the isolated lead plate is arranged with a feeding conveyor belt, a transition conveyor belt, and a coal discharging conveyor belt in sequence along a traveling direction of coal gangue, the feeding conveyor belt, the transition conveyor belt, and the coal discharging conveyor belt decrease in height in sequence and are connected to each other from head to tail to form a tandem conveying path. The industrial visible light camera is arranged above the feeding conveyor belt, and a lens of the industrial visible light camera points to a feeding surface of the feeding conveyor belt. The X-ray source is an X-ray detector disposed on the transition conveyor belt, an emission end of the X-ray detector vertically points to a feeding surface of the transition conveyor belt, and a receiving end is located below the feeding surface of the transition conveyor belt. A signal output end of the industrial visible light camera and a signal output end of the X-ray detector are connected to the personal computer (PC), and the first air nozzle and the second air nozzle are disposed at a discharging end of the feeding conveyor belt and a discharging end of the transition conveyor belt to remove the gangue. An airflow ejection path of the first air nozzle intersects with a throwing path of the feeding conveyor belt, and an airflow ejection path of the second air nozzle intersects with a throwing path of the transition conveyor belt to eject the gangue onto a gangue discharging conveyor belt located below the tandem conveying path. The processor is configured to: S1, obtain a visible light image by an industrial visible light camera taking coal gangue;

S2, extract an image feature set of the coal gangue of a plurality of scales based on processing of the visible light image by a back-end personal computer (PC); and perform multi-level processing on the visible light image entering the PC based on a first preset algorithm, the first preset algorithm including:

$$K_{l+1}(i, j) = \sum_{m=-2}^{2}\sum_{n=-2}^{2} p(m, n) K_l(2i - m, 2i - n),$$

where $K_l(*)$ denotes an $l^{th}$ image, $K_{l+1}(*)$ denotes a $(l+1)^{th}$ image, p(m,n) denotes a 5×5 pixel window function with a low-pass filter property as a Gaussian convolution kernel, m denotes a function value in an x-axis direction in a Gaussian convolution kernel window, n denotes a function value in a y-axis direction in the Gaussian convolution kernel window, and i and j denote pixel values on the x-axis and the y-axis of the image;

S3, determine a target region through a central region proposal network based on the visible light image;

S4, recognize the coal gangue based on a convolutional neural network (CNN) model and send a first separation instruction to a first air nozzle to control the first air nozzle to remove large gangue in the coal gangue;

S5, perform imaging on the coal gangue after the large gangue is removed based on an X-ray source;

S6, extract a target image based on the PC and determining a gray scale value corresponding to the target image, the target image including a high-energy imaging image and a low-energy imaging image;

S7, obtain samples of coal and gangue of different granularity levels by performing sampling based on a coal quality of a current mining area; obtain an image gray scale value of each sample of coal and gangue based on the step S5 and the step S6, establish a database, and obtain a separation threshold of coal and gangue of each granularity level of the current mining area by performing statistics; and match, based on the separation threshold, the image gray scale value of the sample of the coal and gangue to form a mapping set, and store the database in a storage space; and S8, remove the large gangue through the first air nozzle by executing the steps S1-S4, obtain a gray scale value of subsequent coal gangue by executing the step S5 and the step S6, import the gray scale value of the subsequent coal gangue into the mapping set of the step S7, and send a second separation instruction to a second air nozzle to control the second air nozzle to subsequently separate coal and gangue.

BRIEF DESCRIPTION OF THE DRAWINGS

The present disclosure will be further illustrated by way of exemplary embodiments. These exemplary embodiments will be described in detail by way of drawings. These embodiments are non-limiting exemplary embodiments, in which like reference numerals represent similar structures, wherein.

Figure 1:
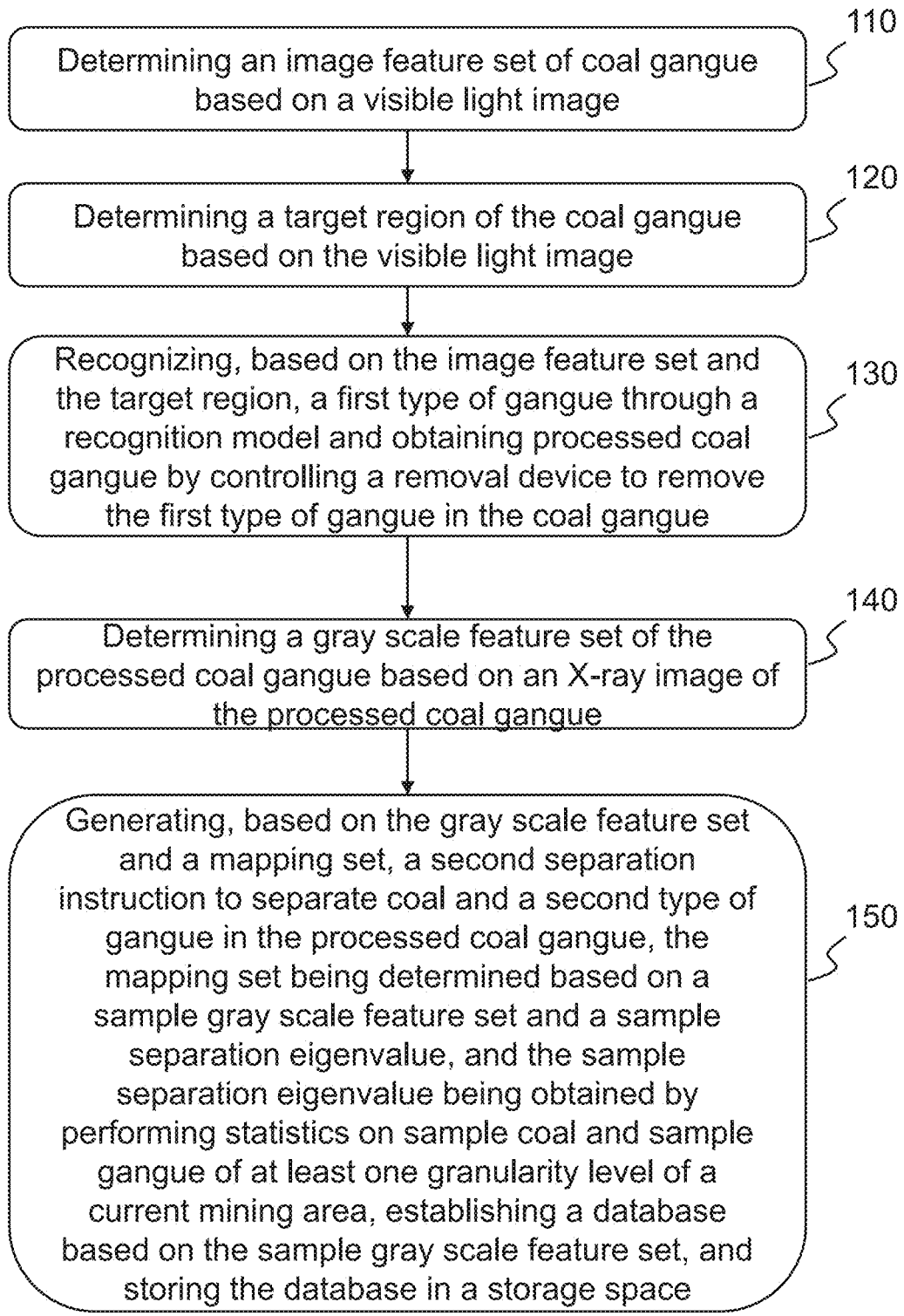
FIG. 1 is a flowchart illustrating an exemplary tandem method for separating coal and gangue based on visible light and an X-ray according to some embodiments of the present disclosure.

In the figures, 410—isolated lead plate; 421—feeding conveyor belt; 422—transition conveyor belt; 423—coal discharging conveyor belt; 424—gangue discharging conveyor belt; 430—industrial visible light camera; 440—X-ray source; 450—removal device; 451—first removal device; 452—second removal device; 460—processor; 470—storage space; 510—industrial visible light camera; 520—isolated lead plate; 530—feeding conveyor belt; 540—transition conveyor belt; 550—coal discharging conveyor belt; 560—X-ray detector; 571—first air nozzle; 572—second air nozzle; 580—gangue discharging conveyor belt; and 590—auxiliary roller.

DETAILED DESCRIPTION

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

FIG. 1 is a flowchart illustrating an exemplary tandem method for separating coal and gangue based on visible light and an X-ray according to some embodiments of the present disclosure. As shown in FIG. 1, the process 100 includes the following operations. In some embodiments, the process 100 may be executed by a processor.

In 110, determining an image feature set of coal gangue based on a visible light image.

The coal gangue refers to a mixture of coal and gangue. The gangue refers to a complex mixture of a series of rock minerals that accompanies a coal seam.

The visible light image refers to an image acquired in a visible wavelength range and is used to coal and/or gangue, etc. that may exist. The visible light image may be obtained in various ways. In some embodiments, the processor may obtain the visible light image via a visible light image acquisition device or a video acquisition device. For example, the processor may obtain the visible light image via an industrial visible light camera erected on a tandem conveying path (e.g., a discharging end of a feeding conveyor belt). More descriptions regarding the industrial visible light camera, the tandem conveying path may be found elsewhere in the present disclosure, e.g., FIG. 4, FIG. 5, and their related descriptions.

The image feature set refers to a set that reflects features of an image in many aspects. In some embodiments, the image feature set may reflect at least one of the features in many aspects, such as a shape, a color, or a texture of an object in the image. In some embodiments, the image feature set may be a multi-scale image derived from the visible light image.

In some embodiments, the processor may determine, based on the visible light image, the image feature set of the coal gangue in various ways. For example, the processor may determine the image feature set of the coal gangue through different image feature extraction manners, machine learning models, etc.

In some embodiments, the processor may determine the image feature set based on the visible light image through multi-scale feature extraction.

The multi-scale feature extraction refers to a manner of extracting features of different scales from an image. For example, the multi-scale feature extraction may include multi-scale convolutional extraction, etc. The multi-scale convolutional extraction refers to a manner of performing feature extraction on an image at multiple scales using convolutional layers. The processor may input the visible light image into a personal computer (PC) and perform preset multilayer processing to obtain the image feature set. For example, the multi-scale feature extraction may be an image pyramid, etc. Exemplarily, the processor may extract sub-images of a plurality of resolutions as the image feature set from the visible light image using a Gaussian pyramid (e.g., equation (1)). More descriptions may be found in the relevant descriptions of Embodiment 1.

In some embodiments, the processor may determine the image feature set based on the visible light image through the multi-scale feature extraction manner (e.g., other image feature extraction manners). For example, the other image feature extraction manners may be at least one of Scale-invariant feature transform (SIFT) feature extraction, Histogram of Oriented Gradient (HOG) feature extraction, Speeded Up Robust Features (SURF) feature extraction, etc.

The image feature set is determined through the multi-scale feature extraction, which may enable the image feature set to reflect the features (e.g., the shape, color, and/or texture) of the coal gangue from multiple scales and multiple layers and improve the accuracy of identifying the type of rock (e.g., the coal and a first type of gangue) using the image feature set.

In 120, determining a target region of the coal gangue based on the visible light image.

The target region refers to a local region in the visible light image that may include coal and/or gangue. In some embodiments, there may be one or more target regions. Each target region may include a set of boundary coordinates on the visible light image, and the set of boundary coordinates encloses to form the target region. The target region may be of a plurality of shapes, which may be preset according to an actual need. The target region may be represented in various ways. For example, a specified target region may be a rectangular region, which may be represented as a vector consisting of coordinates (x1, y1, x2, y2), where x1 and y1 correspond to two-dimensional coordinates of an upper-left corner of the rectangular region, and x2 and y2 correspond to two-dimensional coordinates of the lower-right corner of the rectangular region.

The target region may be determined by different image target detection manners. In some embodiments, the processor may determine, based on the visible light image, the target region of the coal gangue through a central region proposal network (C-RPN). In some embodiments, the processor may determine the target region of the coal gangue based on the visible light image through other image target detection manners. For example, the other image target detection manners may include at least one of a You Only Look Once (YOLO) algorithm, a Single Shot MultiBox Detector (SSD) algorithm, a RetinaNet algorithm, etc.

In some embodiments, the processor may determine the target region of the coal gangue based on the visible light image through an image target detection model. An input of the image target detection model includes the visible light image, and an output of the image target detection model includes at least one target region. The at least one target region may be characterized by two-dimensional coordinates.

The image target detection model refers to a model that determines a target of interest from an image. In some embodiments, the image target detection model may be a machine learning model. The image target detection model may include a Deep Neural Networks (DNN) model, a Graph Neural Networks (GNN) model, or the like, or any combination thereof.

In some embodiments, the image target detection model may be obtained by training a large number of first training samples and first training labels corresponding to the first training samples. Each of the first training samples may include a sample visible light image of sample coal gangue. The first training samples may be obtained from historical data of coal gangue sorting in a current mining area. The first training labels are sample target regions corresponding to the first training samples. The first training labels may be obtained by manual or automatic labeling.

In some embodiments, the processor may determine, based on the visible light image, a plurality of image sub-regions by performing image segmentation. For each image sub-region of the plurality of image sub-regions, the processor may determine a plurality of different gray scale mean values in the each image sub-region, determine a gray scale mean value of the visible light image, and determine the target region. More descriptions may be found elsewhere in the present disclosure, e.g., FIG. 2 and its related descriptions.

In 130, recognizing, based on the image feature set and the target region, a first type of gangue through a recognition model and obtaining processed coal gangue by controlling a removal device to remove the first type of gangue in the coal gangue, the recognition model being a machine learning model.

The first type of gangue refers to gangue whose granularity divided through the visible light image satisfies a first preset condition. The first preset condition refers to a judgment condition of a granularity range of the first type of gangue. For example, the preset condition is that the first type of gangue is gangue with the granularity larger than a first preset threshold. In some embodiments, the first preset threshold may be preset according to an actual need. For example, the processor may set by counting historical data of the coal gangue sorting based on the visible light image in the current mining area. Exemplarily, the first preset threshold may be one of 25 mm, 30 mm, 35 mm, 40 mm, etc.

The recognition model refers to a model for recognizing the first type of gangue from the coal gangue. In some embodiments, the recognition model is a machine learning model. For example, the recognition model is a neural networks (NN) model.

In some embodiments, an input of the recognition model includes the image feature set and one or more target regions. In some embodiments, an output of the recognition model is rock types corresponding to the one or more target regions. For example, coal may be represented as 0, and the first type of the gangue may be represented as 1.

In some embodiments, the recognition model may be obtained by training a large number of second training samples and second training labels corresponding to the second training samples. Each set of training samples in the second training samples may include a sample image feature set and a sample target region. The second training samples may be obtained from historical data of coal gangue sorting in the current mining area. The second training labels corresponding to the second training samples are rock categories corresponding to one or more target regions corresponding to each set of training samples. The second training labels corresponding to the second training samples may be obtained by manual labeling. For example, coal may be labeled as 0, and the first type of gangue may be labeled as 1.

In some embodiments, the recognition model is a convolutional neural network model. In some embodiments, the recognition model includes a convolutional layer, a tiling layer, an activation layer, and a classification layer. The convolutional layer is configured to perform convolutional processing based on the image feature set and the target region and extract the processed image features. For example, the processor may establish the convolutional layer via equation (6), perform convolutional processing, and extract the processed image features. The tiling layer is configured to perform image compression based on the processed image features to obtain compressed image features. For example, the processor may establish the tiling layer for image compression via equation (7). The activation layer is configured to perform a nonlinear transformation based on the compressed image features to obtain the transformed image features. For example, the processor may obtain an activation function of the activation layer via equation (8) to perform the nonlinear transformation. The classification layer is configured to perform classification based on the transformed image features to recognize the first type of gangue from the coal gangue. For example, the processor may establish the classification layer using a Sigmoid probability function for classification. More descriptions regarding the recognizing the first type of gangue via the convolutional neural network model may be found in the relevant descriptions of Embodiment 1 of the present disclosure.

The first type of gangue with a relatively large granularity level is recognized from the coal gangue through the convolutional neural network model, and the convolutional neural network model may process the input data efficiently and quickly in the recognition process and have a relatively good tolerance for the noise and errors in the input data, which ensures the efficiency and accuracy of the recognition at the same time.

The removal device refers to a device for removing/separating gangue from the coal gangue. In some embodiments, the processor may generate a first separation instruction to separate the first type of gangue based on a first type of gangue recognition result, send the first separation instruction to the removal device to control the removal device to remove the first type of gangue in the coal gangue, and obtain the processed coal gangue.

Figure 4:
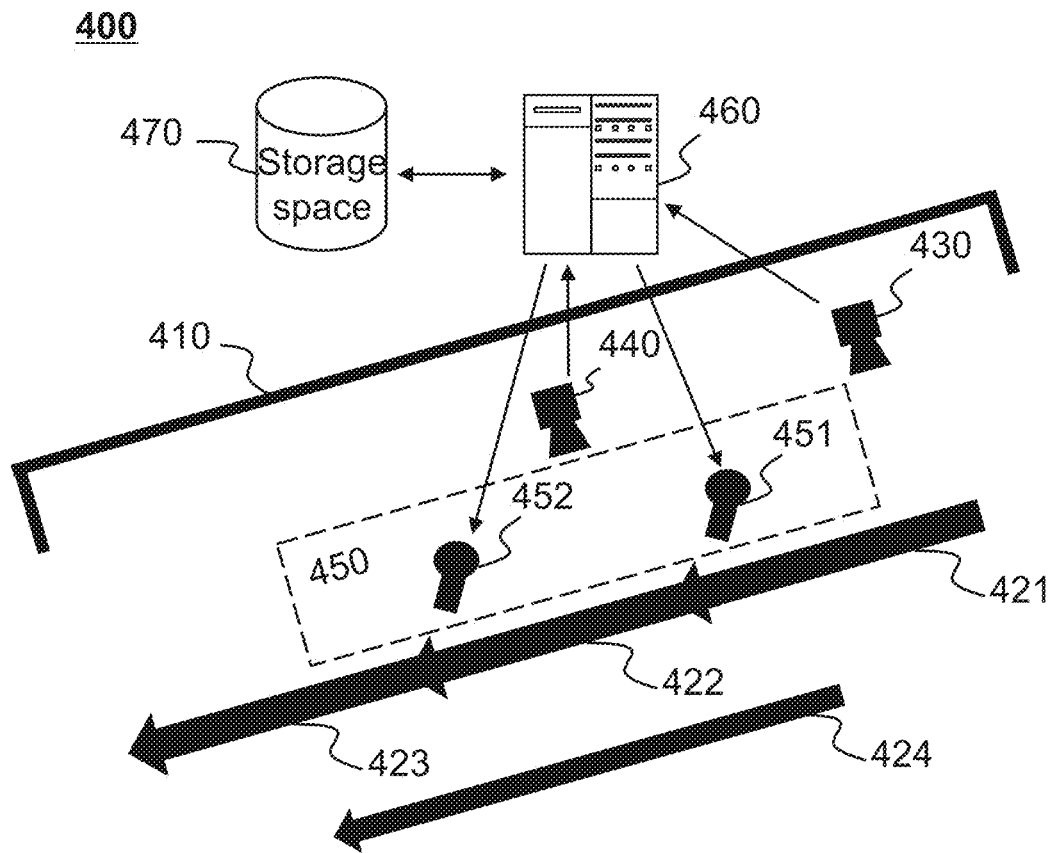
FIG. 4 is an exemplary schematic diagram illustrating a tandem device for separating coal and gangue based on visible light and an X-ray according to some embodiments of the present disclosure.
Figure 5:
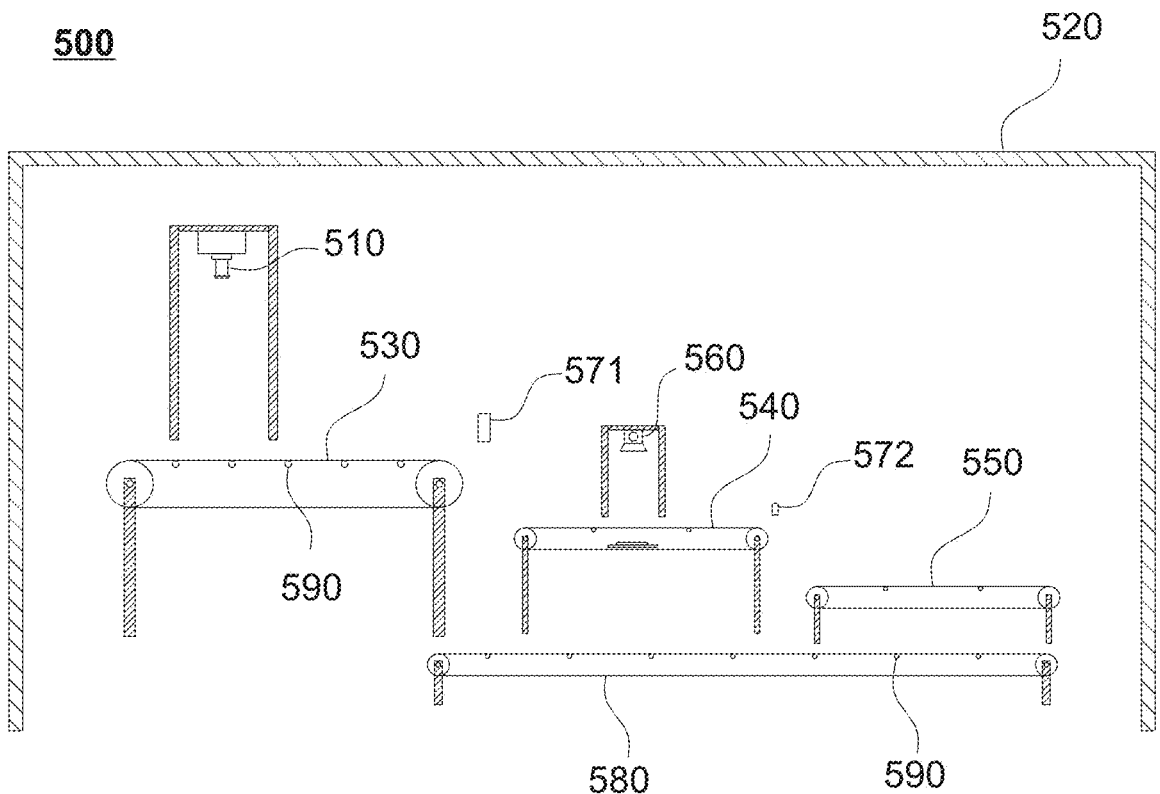
FIG. 5 is a schematic diagram illustrating an exemplary structure of a tandem device for separating coal and gangue based on visible light and an X-ray according to other embodiments of the present disclosure.

More descriptions regarding the removal device may be found elsewhere in the present disclosure, e.g., FIG. 4, FIG. 5, and their related descriptions.

In 140, determining a gray scale feature set of the processed coal gangue based on an X-ray image of the processed coal gangue.

The X-ray image refers to an image acquired in an X-ray wavelength range. The X-ray image may be used to show coal and/or gangue that may exist.

In some embodiments, the processor may obtain the X-ray image of the processed coal gangue. For example, the processor may obtain the X-ray image via an X-ray detector. The X-ray detector is a single-energy X-ray detector, and the single-energy X-ray detector may detect intensity attenuation of single-energy X-rays as they pass through the processed coal gangue. As another example, the processor may receive the X-ray image of the coal gangue that is input by a user based on an input device in the coal gangue separation device.

In some embodiments, the X-ray image may include a high-energy imaging image and a low-energy imaging image. The high-energy imaging image is an image acquired by irradiation using high-energy X-rays. For example, energy of the high-energy X-rays may be greater than 1 MeV, etc. The low-energy imaging image is an image acquired by irradiation using low-energy X-rays. For example, energy of the low-energy X-rays may be less than 1 MeV, etc.

In some embodiments, the processor may acquire the high-energy imaging image and the low-energy imaging image via an X-ray detector. For example, the X-ray detector is a dual-energy X-ray detector. The dual-energy X-ray detector may detect intensity attenuation of two X-rays of different energies as they pass through the processed coal gangue. The X-ray detector is arranged at a position where an image of the processed coal gangue may be acquired, for example, at a discharging end of a transition conveyor belt of a tandem conveying path. The processor may acquire the X-ray image including the high-energy imaging image and the low-energy imaging image from the X-ray detector.

Figure 2:
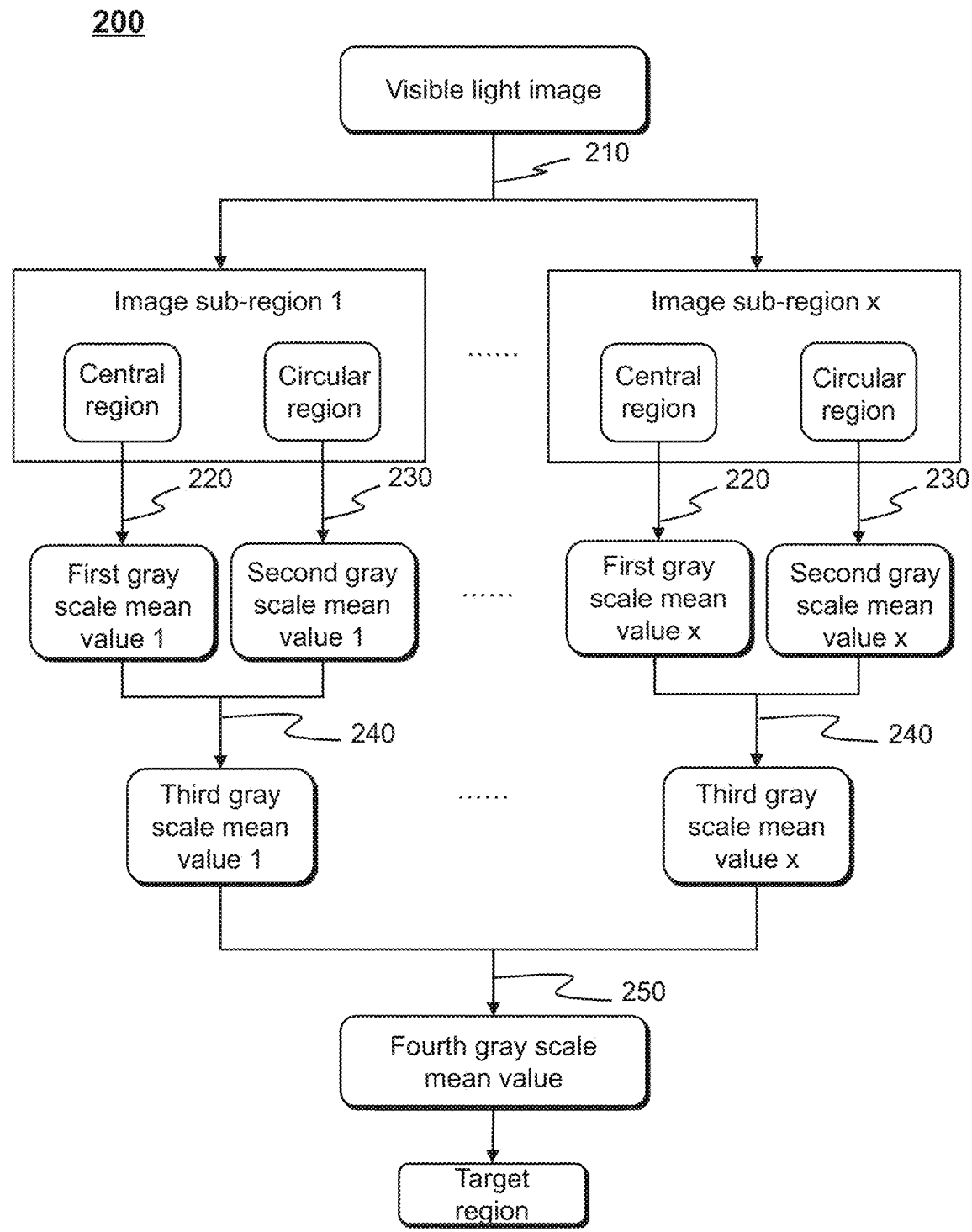
FIG. 2 is a flowchart illustrating an exemplary process for determining a target region according to some embodiments of the present disclosure.

More descriptions regarding the X-ray detector may be found elsewhere in the present disclosure, e.g., such as FIG. 2 and its related descriptions.

The gray scale feature set is a set of the processed coal gangue features reflected by a degree of X-ray absorption by the processed coal gangue.

In some embodiments, the gray scale feature set includes a gray scale value R of one or more of candidate regions and an X-ray image corresponding to the candidate regions. The candidate regions are regions that may be coal or gangue. The candidate region has a gray scale variation compared to a background of the X-ray image. The background refers to a portion of the X-ray image that is not associated with the region of interest (e.g., coal or gangue).

In some embodiments, the processor may extract and determine the gray scale feature set based on the high-energy imaging image and the low-energy imaging image via the PC. The PC may determine the gray scale feature set using algorithms, rules, etc. pre-stored in a storage space.

In some embodiments, the processor may determine the gray scale feature set based on the high-energy imaging image and the low-energy imaging image through gray scale value calculation. The gray scale value calculation is an algorithm for determining the candidate regions and the gray scale value of the candidate regions, which may be preset in advance.

The determining the candidate regions is related to the X-ray intensity attenuation. For example, a region without the coal gangue absorb little X-rays, so that, compared to the background, there is no intensity attenuation of X-rays or minimal intensity attenuation of X-rays on the X-ray image in the region, and a change in the gray scale values is minimal. Coal and gangue have different degrees of X-ray absorption, so that the candidate region where the coal gangue is located has obvious X-ray intensity attenuation and change in gray scale values compared to the background.

The processor may determine the candidate regions in various ways based on the high-energy imaging image and the low-energy imaging image. In some embodiments, the processor may determine regions in which an X-ray intensity change of the high-energy region and an X-ray intensity change of the low-energy region meet a preset condition as the candidate regions. The preset condition is a threshold condition for determining the candidate region based on the X-ray intensity change. For example, the X-ray intensity change of the low-energy region may be determined based on a deviation value between an intensity of the low-energy region before X-rays transmit an object and an intensity of the low-energy region after the X-rays transmit the object.

The intensity of the low-energy region before the X-rays transmit the object may be expressed by, and the intensity of the low-energy region after the X-rays transmit the object may be expressed by. The X-ray intensity change of the high-energy region may be determined based on a deviation value between an intensity of the high-energy region before the X-rays transmit the object and an intensity of the high-energy region after the X-rays transmit the object. The intensity of the high-energy region before the X-rays transmit the object may be expressed by, and the intensity of the high-energy region after the X-rays transmit the object may be expressed by. The preset condition may be set manually based on experience. For example, the preset condition may be set to be that the X-ray intensity change of the high-energy region and the X-ray intensity change of the low-energy region is greater than or equal to 1, 2, 3, 4, 5 keV, etc.

In some embodiments, the processor may determine the gray scale feature set (e.g., gray scale values of one or more candidate regions) in various ways based on a mass absorption coefficient of the object in the low-energy region and a mass absorption coefficient of the object in the high-energy region The mass absorption coefficient refers to an ability of a substance per unit mass to absorb radiation. The mass absorption coefficient of the low-energy region may be expressed by, and the mass absorption coefficient of the high-energy region may be expressed by. In some embodiments, the gray scale value is positively correlated with the mass absorption coefficient of the low-energy region and negatively correlated with the mass absorption coefficient of the high-energy region. For example, the processor may calculate the gray scale value by equation (9). More descriptions may be found in the relevant descriptions of Embodiment 1 of the present disclosure.

Through the calculation of the gray scale value, which makes the gray scale feature of a second type of gangue with a relatively small granularity level and the gray scale feature of the coal have a relatively good separability, so as to facilitate the subsequent identification and separation of the second type of gangue from the processed coal gangue and improve the identification accuracy.

In 150, generating, based on the gray scale feature set and a mapping set, a second separation instruction to separate coal and a second type of gangue in the processed coal gangue, the mapping set being determined based on a sample gray scale feature set and a sample separation eigenvalue, and the sample separation eigenvalue being obtained by performing statistics on sample coal and sample gangue of at least one granularity level of a current mining area, establishing a database based on the sample gray scale feature set, and storing the database in a storage space.

Figure 3:
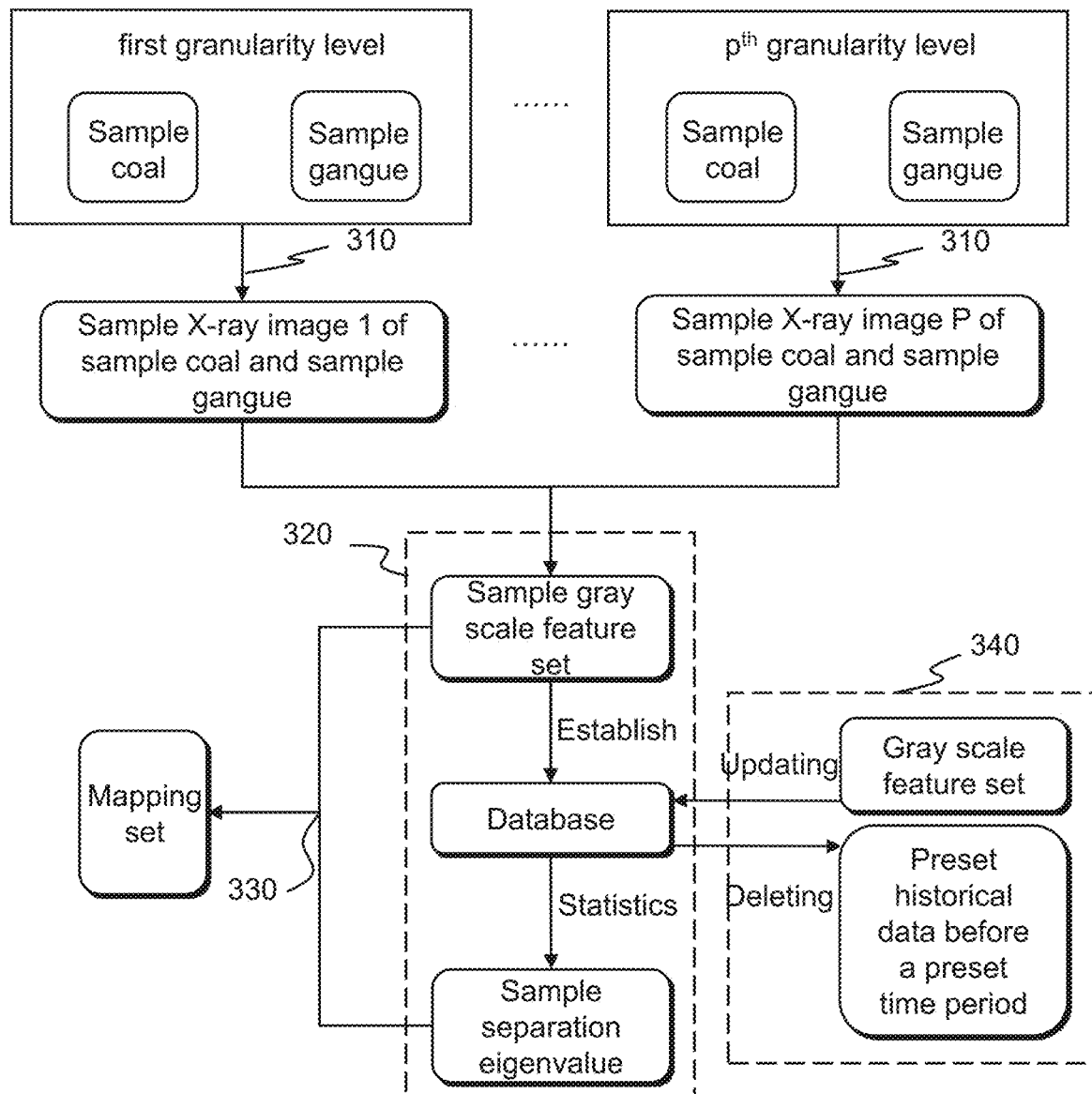
FIG. 3 is a flowchart illustrating an exemplary process for determining a mapping set according to some embodiments of the present disclosure.

More descriptions regarding the storage space may be found elsewhere in the present disclosure, e.g., FIG. 3, FIG. 4, and their related descriptions.

The second type of gangue refers to gangue whose granularity divided through the X-ray image satisfies a second preset condition. The second preset condition refers to a judgment condition of a granularity range of the second type of gangue. For example, the second preset condition is that the second type of gangue is gangue with the granularity smaller than a second preset threshold. In some embodiments, the second preset threshold may be set by counting historical data of the coal gangue sorting based on the visible light image in the current mining area. In some embodiments, the second preset threshold may be equal to the first preset threshold, or the second preset threshold may be greater than the first preset threshold, which may be set according to an actual need.

The sample coal refers to coal randomly sampled from the current mining area. The sample gangue refers to gangue randomly sampled from the current mining area. In some embodiments, the sample coal and the sample gangue may be divided into a plurality of granularity levels based on a granularity range. For example, the sample coal and the sample gangue sampled in the current mining area have a granularity range of 8 mm to 40 mm, and the sample coal and the sample gangue may be divided into the plurality of granularity levels based on a gradient of variation of 3 mm, 5 mm, etc. The processor may preset the granularity range and the gradient of variation according to an actual need.

The sample gray scale feature set is a set of features reflecting a degree of X-ray absorption of the sample coal and the sample gangue. In some embodiments, the sample gray scale feature set includes a gray scale value of a sample coal region and a gray scale value of the sample gangue region, and a sample X-ray image of the sample coal and the sample gangue of at least one granularity level.

The database refers to a set used to storing information/data related to coal gangue separation. In some embodiments, the processor may establish the database based on the sample gray scale feature set of the sample coal and the sample gangue of at least one granularity level. For example, the processor may receive the sample gray scale feature set of the sample coal and the sample gangue of the at least one granularity level that is input by the user based on the input device in the coal gangue separation device. As another example, the processor may determine the sample gray scale feature set based on the sample X-ray image. The manner of the processor determining the sample gray scale feature set differs from the manner of determining the gray scale feature set of the processed coal gangue only in that the gray scale feature set is determined based on the X-ray image of the processed coal gangue, and the sample gray scale feature set is determined based on the sample X-ray image corresponding to the sample coal and the sample gangue. More descriptions may be found in the descriptions of FIG. 1.

In some embodiments, the processor may establish the database to store the obtained sample gray scale feature set and store the database in the storage space.

In some embodiments, the processor may also update the database based on the gray scale feature set. More descriptions may be found in the related descriptions of FIG. 3.

The sample separation eigenvalue is an eigenvalue/threshold that divide the coal and gangue of a specified granularity level based on the gray scale values. In some embodiments, a count of sample separation eigenvalues corresponds to a count of granularity levels. For example, if there are randomly acquired sample gangue and sample coal in the current mining area of a total of p granularity levels, there are p statistical sample separation eigenvalues.

Figure 7:
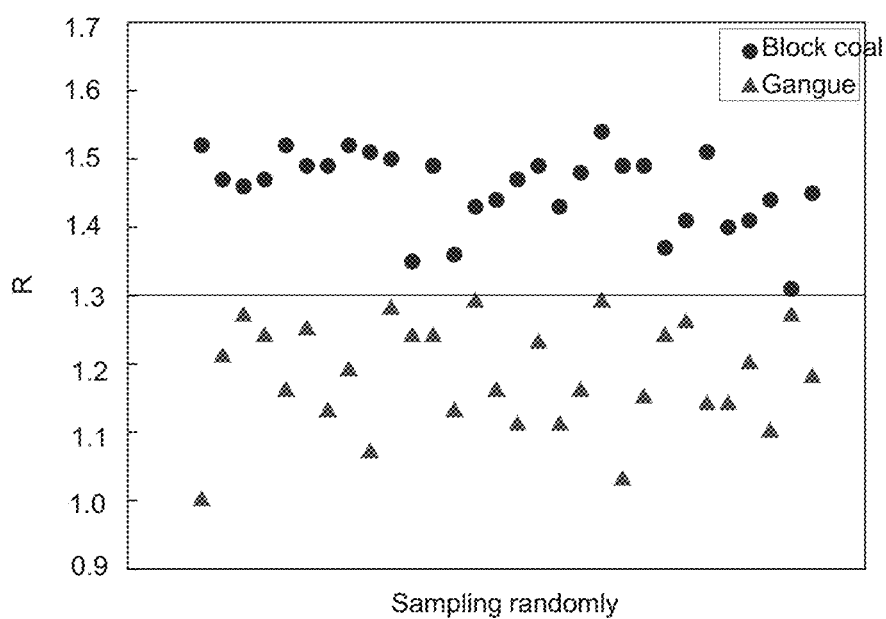
FIG. 7 is a graph of distribution of gray scale values of coal and gangue according to some embodiments of the present disclosure.

The sample separation eigenvalue is related to the gray scale values of the sample coal and the sample gangue. In some embodiments, based on the sample gray scale feature set of the sample coal and the sample gangue of the at least one granularity level stored in the database, the processor may call and determine, based on the gray scale values of the sample coal and the sample gangue of each granularity level, the sample separation eigenvalue of the granularity level through a statistical manner, etc. For example, as shown in FIG. 7, the processor may perform numerical statistics on distribution ranges of the gray scale values of the sample coal and the sample gangue of the same granularity level obtained by random sampling, respectively. Assuming that the gray scale value of the sample coal under the granularity level is distributed in a range of (1.3,1.6), and the gray scale value of the sample gangue under the granularity level is distributed in a range of (1.0,1.3), the processor may determine that the sample separation eigenvalue under the granularity level is 1.3. The processor may also determine the sample separation eigenvalue of the at least one granularity level based on the database through any other feasible manner, for example, human input. In some embodiments, the processor may store the statistical sample separation eigenvalue and/or the determined mapping set, etc., in the database and/or the storage space.

The mapping set refers to a set of elements associated with recognizing coal and the second type of gangue. In some embodiments, the processor may determine one or more sets of mapping based on the sample gray scale feature sets in the database and the sample separation eigenvalues determined based on the database to form the mapping set. Each set of mapping corresponds to a matching relationship between each rock type (e.g., coal and second type of gangue) of a granularity level, a range of gray scale value corresponding to the rock type, and the sample X-ray image corresponding to the rock type. The ranges of gray scale value of different rock types under the same granularity level are determined based on the sample separation eigenvalue. For example, assuming that the sample separation eigenvalue under the specified granularity level is a, the range of gray scale value of coal is greater than or equal to a, and the range of gray scale value of the second type of gangue is less than a. In some embodiments, the processor may determine, based on an updated database, the sample separation eigenvalue, the mapping set, etc., in the same manner described above.

More descriptions regarding the determining the mapping set may be found elsewhere in the present disclosure, e.g., in FIG. 3 and its related descriptions.

In some embodiments, the processor may determine a composition of the coal gangue (coal or gangue) based on the gray scale feature collection and database. For example, the processor may perform matching through the mapping set formed by the database based on a gray scale feature set corresponding to the X-ray image of the coal gangue to be determined and determine whether the coal gangue to be determined is coal or the second type of gangue.

In some embodiments, the processor may determine whether the candidate region is the second type of gangue based on the gray scale feature set by importing the X-ray image and the gray scale value of each candidate region into the mapping set for matching.

In some embodiments, the processor may determine the granularity level of each candidate region based on the gray scale feature set by performing contour matching on the X-ray image of the each candidate region and the sample X-ray image in the mapping set. For example, the processor may determine a target sample X-ray image that matches the X-ray image of the candidate region through Hu moment matching, contour tree matching, or pairwise geometric histogram matching from the sample X-ray images of the sample coal and the sample gangue of various granularity levels of the mapping set. The processor may determine the granularity level of the candidate region based on the granularity level corresponding to the target sample X-ray image.

In some embodiments, the processor may determine a rock type of each candidate region based on the granularity level of the each candidate region, the gray scale value of the each candidate region, and the mapping set. For example, the processor determines the rock type matched by the each candidate region and recognizes the second type of gangue in the processed coal gangue by importing the granularity level and the gray scale value of the each candidate region into the mapping set for gray scale matching.

In some embodiments, the processor may generate the second separation instruction to separate the second type of gangue based on a second type of gangue recognition result, and send the instruction to the removal device to control the removal device to remove the second type of gangue in the processed coal gangue. The separation instruction is an instruction that instructs the removal device to perform a gangue removal/separation operation. The separation instruction includes the first separation instruction, the second separation instruction, etc.

In the method for separating coal and gangue in some embodiments of the present disclosure, the first type of gangue and the second type of gangue may be sorted based on the visible light image and the X-ray image according to the granularity level. The method not only covers coal and gangue of all granularity levels, but also ensures that coal and gangue of each granularity level are accurately sorted, which provides a basic guarantee for realizing the integrated process of sorting from feeding to outputting the coal gangue.

FIG. 2 is a flowchart illustrating an exemplary process for determining a target region according to some embodiments of the present disclosure. As shown in FIG. 2, process 200 includes the following operations. In some embodiments, process 200 may be executed by a processor.

In 210, determining, based on a visible light image, a plurality of image sub-regions by performing image segmentation.

More descriptions regarding the visible light image may be found in the related descriptions of FIG. 1 of the present disclosure.

The image sub-region is a local image of a visible light image of a preset size. In some embodiments, the plurality of image sub-regions may be stitched together to form a complete visible light image without image overlap and blankness between the image sub-regions.

In some embodiments, the processor may obtain a plurality of consecutive image sub-regions of a preset size based on the visible light image through an image segmentation technique. The preset size refers to a size of each image sub-region, which may be determined by manual setting. For example, if a size of the visible light image iM×jN pixels, and the processor may obtain image sub-region 1 to image sub-region x of a preset size of i×j pixels (e.g., 50×50 pixels) through the image segmentation technique, and a count x of image sub-regions is equal to M×N.

In some embodiments, for each image sub-region of the plurality of image sub-regions, the processor may determine gray scale values of different regions of the each image sub-region through the operations 220 to 240 below. For example, for image sub-region 1 to image sub-region x, the processor may sequentially determine a first gray scale mean value (e.g., a first gray scale mean value 1 to a first gray scale mean value x), a second gray scale mean value (e.g., a second gray scale mean value 1 to a second gray scale mean value x), and a third gray scale mean value (e.g., a third gray scale mean value 1 to a third gray scale mean value x).

In 220, determining a first gray scale mean value of a central region in the each image sub-region, a size of the central region being smaller than a size of the each image sub-region.

Figure 6:
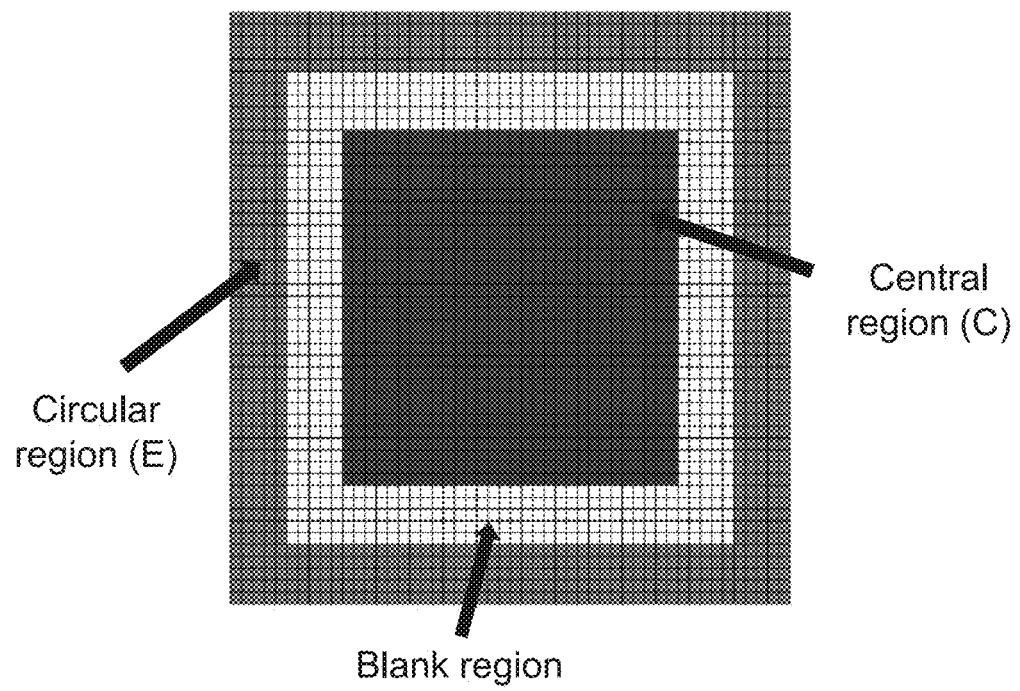
FIG. 6 is a schematic diagram illustrating division of an image sub-region according to some embodiments of the present disclosure.

The central region is a local image of the image sub-region, and the central region is centered around a center of the image sub-region. For example, as shown in FIG. 6, assuming that a size of the image sub-region is 50×50 pixels, a size of the central region (C) may be 30×30 pixels. The center of the image sub-region coincides with the center of the central region (C).

The first gray scale mean value is an average gray scale value of the central region. The first gray scale mean value may be expressed as $C_{average\_gray}$.

In some embodiments, for the each image sub-region, the processor may determine the first gray scale mean value in various ways based on a total gray scale value of the central region and a count of pixels in the central region. For example, if the size of the image sub-region is 50×50 pixels, and the size of the central region is 30×30 pixels, the total gray scale value of the central region may be expressed as $C_{sum\_gray}$, and the count of pixels in the central region may be expressed as $PX_C$ (900). In some embodiments, the processor may obtain the first gray scale mean value by calculating (e.g., by equation (2)). More descriptions may be found the related descriptions of Embodiment 1 of the present disclosure.

In 230, determining a second gray scale mean value of a circular region in the each image sub-region.

The circular region is a portion of the each image sub-region after the central region is removed. For example, as shown in FIG. 6, a size of the image sub-region is 50×50 pixels, a size of the central region is 30×30 pixels, and an overlay size of the central region and a blank region is 40×40 pixels. The circular region (E) is a region of the image sub-region after the central region (C) and the blank region are removed, and a size of the circular region (E) is 50×50 pixels−40×40 pixels.

The second gray scale mean value is an average gray scale value of the circular region. The second gray scale mean value may be expressed as $E_{average\_gray}$.

In some embodiments, for each image sub-region, the processor may determine the second gray scale mean value in various ways based on the total gray scale value of the circular region and a count of pixels in the circular region. For example, if the size of the image sub-region is 50×50 pixels, and the overlay size of the central region and the blank region is 40×40 pixels, the total gray scale value of the circular region may be expressed as $E_{sum\_gray}$, and the count of pixels in the circular region may be expressed as $PX_E$ (900). In some embodiments, the processor may obtain the second gray scale mean value by calculating (e.g., by equation (3)). More descriptions may be found in the related descriptions of Embodiment 1 of the present disclosure.

In 240, determining a third gray scale mean value of the each image sub-region based on the first gray scale mean value and the second gray scale mean value.

The third gray scale mean value is an average gray scale value of the image sub-region. The third gray scale mean value may be expressed as Encircle−City(m, n) or E-C(m, n), where (m, n) denotes that the image sub-region is located in an $m^{th}$ row and an $n^{th}$ column of the visible light image.

In some embodiments, for each image sub-region, the processor may determine the third gray scale mean value based on the first gray scale mean value and the second gray scale mean value in various ways. In some embodiments, the processor may obtain the third gray scale mean value by calculating (e.g., by equation (4)). More descriptions may be found in the related descriptions of Embodiment 1 of the present disclosure.

In 250, determining a fourth gray scale mean value of the visible light image based on the plurality of the third gray scale mean values corresponding to the plurality of image sub-regions and determining the target region.

The fourth gray scale mean value is an average gray scale value of the visible light image. The fourth gray scale mean value may be expressed as Average_gray.

In some embodiments, the processor may determine the fourth gray scale mean value based on the third gray scale mean value of all the image sub-regions and a count of image sub-regions of the visible light image. For example, the processor may obtain the fourth gray scale mean value by calculating (e.g., by equation (5)). More descriptions may be found in the related descriptions of Embodiment 1 of the present disclosure.

In some embodiments, the processor may determine the target region in the visible image through a preset calculation manner based on the third gray scale mean value and fourth gray scale mean value. The preset calculation manner refers to a manner for determining the target area that is preset in advance.

The target region is determined, which helps to establish a matching relationship between the image feature set and the coal gangue as the target object. Subsequently, based on the image feature set that matches the target region, when the first type of gangue is recognized through the recognition model, the quality of the model input may be effectively improved, and the noise may be reduced, which facilitates cooperating with the recognition model and improves the accuracy of the recognition.

FIG. 3 is a flowchart illustrating an exemplary process for determining a mapping set according to some embodiments of the present disclosure. As shown in FIG. 3, process 300 includes the following operations. In some embodiments, process 300 may be executed by a processor.

In 310, obtaining sample X-ray images of sample coal and sample gangue of at least one granularity level.

In some embodiments, the processor may obtain sample X-ray images of sample coal and sample gangue of a plurality of granularity levels (e.g., a first granularity level to a $p^{th}$ granularity level). Exemplarily, the sample coal and the sample gangue of a granularity in a range of 10 nm to 30 nm may be selected, and p granularity levels are set according to a gradient of variation of 2 mm. From the first granularity level to the $p^{th}$ granularity level, there are 10 sample coal and 10 sample gangue of each granularity level. The processor may accordingly obtain the sample X-ray images of the sample coal and the sample gangue of each granularity level, including sample X-ray images 1 of the sample coal and the sample gangue of the first granularity level to sample X-ray images p of the sample coal and the sample gangue of the $p^{th}$ granularity level. The sample X-ray images of the sample coal and the sample gangue of each granularity level may be an image set including sample X-ray images of various rock samples.

More descriptions regarding the sample coal and the sample gangue may be found in FIG. 1 and its related descriptions.

The sample X-ray images of the sample coal and the sample gangue of the at least one granularity level may be obtained in a manner similar to the manner of obtaining the X-ray image of the processed coal gangue. More descriptions regarding the obtaining the sample X-ray images may be found elsewhere in the present disclosure, e.g., FIG. 1 and its related descriptions.

In 320, determining the sample gray scale feature set based on the sample X-ray images, establishing the database, and obtaining the sample separation eigenvalue by performing statistics.

More descriptions regarding the determining the sample gray scale feature set, establishing the database, and obtaining the sample separation eigenvalue by performing statistics may be found in FIG. 1 and its related descriptions.

In some embodiments, for sample coal and sample gangue of each granularity level, the sample gray scale feature set includes a gray scale value R of the sample coal under the granularity level and a sample X-ray image corresponding to the sample coal under the granularity level, and a gray scale value R of the sample gangue under the granularity level and a sample X-ray image corresponding to the sample gangue under the granularity level.

In some embodiments, the sample X-ray image includes a sample high-energy imaging image and a sample low-energy imaging image. For the sample coal and sample gangue of each granularity level, the processor may determine, based on the corresponding sample high-energy imaging image and the sample low-energy imaging image, a sample gray scale feature set of the sample coal and the sample gangue of the granularity level through the gray scale value calculation. More descriptions may be found in the related descriptions of FIG. 1 of the present disclosure.

In 330, determining the mapping set based on the sample gray scale feature set and the sample separation eigenvalue.

In some embodiments, the processor may determine one or more sets of mapping to form the mapping set based on the sample gray scale feature set and the sample separation eigenvalue. More descriptions may be found in the related descriptions of the operation 150 of FIG. 1 of the present disclosure.

In 340, updating, based on the gray scale feature set, the database and deleting preset historical data before a preset time period.

More descriptions regarding the gray scale feature set may be found in FIG. 1 and its related descriptions.

The preset historical data refers to relevant historical data in the database. In some embodiments, the preset historical data includes a historical gray scale feature set and/or the sample gray scale feature set. The historical gray scale feature set refers to a partial gray scale feature set in historical time.

The preset time period is a time interval that starts at a current time point and ends at a preset historical time point.

The processor may determine the preset time period in various ways. In some embodiments, the processor may determine the preset time period based on a user input. For example, the preset time period may be a parameter that is set manually based on experience. In some embodiments, the preset time period may be 10 hours. When the preset time period is 10 hours, the preset historical data refers to the historical gray scale feature set and/or the sample gray scale feature set in the database before 10 hours.

The longer the preset time period, the greater the storage pressure of the storage space. A time used to determine the coal gangue type using the mapping set and an operational pressure of the processor may increase accordingly, and data representativeness may decrease. In some embodiments of the present disclosure, the reasonable preset time period may be determined, which balances data processing efficiency and effect of the processor.

In some embodiments, the processor may update the database in various ways based on the gray scale feature set. In some embodiments, the processor may update the database in real time based on the gray scale feature set and delete the preset historical data before the preset time period. For example, in the process of coal gangue sorting in a current mining area, as the coal and the second type of gangue in the processed coal gangue are continually being separated, the gray scale feature set of the separated coal and the second type of gangue are continually being generated. The processor may upload the gray scale feature set of the separated coal and the second type of gangue to the database for storage in real time. The processor may also synchronously and dynamically delete the preset historical data before a preset time period from the database. The start time of the preset time period is determined by a generation time of corresponding storage data. In some embodiments, the processor may update the database based on the gray scale feature set in other ways, such as periodically update.

In some embodiments, the processor may update the sample separation eigenvalue, the mapping set, etc. based on the updated database. The processor may generate a second separation instruction based on a subsequent gray scale feature set and the updated mapping set to separate the coal and the second type of gangue in the subsequent processed coal gangue.

The sample separation eigenvalue and the mapping set are updated in a way similar to the way the database is update. More descriptions regarding the updating the sample separation eigenvalue and the mapping set may be found in the relevant descriptions of FIG. 3.

In some embodiments, the processor may determine deviation data based on a current gray scale feature set and candidate historical data before a candidate time period; determine, in response to the deviation data satisfying a preset deviation condition, the candidate time period as a target time period; and determine, based on the target time period, the preset time period.

The candidate time period is a time interval that starts at a current time point and ends at a candidate historical time point. There may be one or more candidate time periods. In some embodiments, the processor may determine the candidate time period based on user input, or the processor may generate the candidate time period randomly or based on a preset rule, etc. For example, the preset rule may be to generate a plurality of candidate time periods by gradient at n fixed interval (e.g., 1 hour, 2 hours, or 3 hours).

The current gray scale feature set refers to a gray scale feature set generated in the time period from the current time point. The time period from the current time point may be 5 minutes, 10 minutes, etc., which may be preset according to an actual need.

The candidate historical data is a historical gray scale feature set generated before the candidate time period.

The deviation data is data that reflects a degree to which the current gray scale feature set differs from the candidate historical data.

In some embodiments, the processor may determine the deviation data in various ways based on the current gray scale feature set with the candidate historical data. In some embodiments, the deviation data is related to a data similarity of the current gray scale feature set and the candidate historical data. For example, the processor may calculate the similarity of the current gray scale feature set and the candidate historical data by a similarity algorithm and determine (1−similarity) as the deviation data. The similarity and the deviation data are values between 0 and 1. The similarity algorithm may be a hash algorithm, a mean square error algorithm, a feature matching algorithm, or the like, or any combination thereof.

The preset deviation condition is a judgment condition for determining the target time period. For example, the preset deviation condition is that a candidate time period corresponding to the deviation data greater than a deviation threshold is the target time period. The deviation threshold is a value between 0 and 1, which may be set manually based on experience. In some embodiments, the larger the deviation data, the lower the ability of the candidate historical data to reflect a feature of the coal gangue in the current mining area. For example, the deviation data between the candidate historical data before a hour(s) and the current gray scale feature set is b. In response to the deviation data b being greater than the deviation threshold c, the processor may determine the candidate time period of the a hour(s) corresponding to the candidate historical data as the target time period.

In some embodiments, the processor may determine the preset time period based on the target time period in various ways. For example, the processor may directly determine the target time period as the preset time period.

The preset time period may be determined based on the deviation between the current gray scale feature set and the candidate historical data, so that the data with a relatively low response ability to the feature of coal gangue in the current mining area may be deleted, which optimizes the usage efficiency of the storage space, ensures that the processor is in a good operating state, and further improves the efficiency and accuracy of subsequent sorting of coal and gangue.

In some embodiments, the preset time period is related to a storage proportion, a storage speed, and a storage volume of the storage space. The processor may determine, in response to the storage proportion satisfying a storage proportion condition, a storage margin time based on the storage proportion, the storage speed, and the storage volume and determine the preset time period based on the storage margin time, a preset value, and the target time period.

The storage volume is a maximum capacity of data that may be stored in the storage space. The storage proportion is a proportion of occupied storage volume to a total storage volume. The storage speed is a data access speed of the storage space.

The storage proportion condition is a condition that determines whether the storage proportion is too high, which may be set manually based on experience. For example, the storage proportion condition may be that the storage proportion is higher than one of 60%, 65%, 70%, 75%, etc.

The storage margin time is a time it takes for an unoccupied storage volume in the storage space to decrease to a minimum storage volume requirement that meet operation of the processor.

In some embodiments, the higher the current storage proportion, the greater the likelihood that the unoccupied storage volume in the storage space fails to meet the minimum storage volume requirement for the processor to work. The processor may determine whether the current storage proportion satisfies the storage proportion condition and evaluate to determine the storage margin time when the storage proportion condition is satisfied.

In some embodiments, in response to the storage proportion satisfying the storage proportion condition, the processor may determine the storage margin time based on the storage proportion, the storage speed, and the storage volume in various ways. For example, the storage margin time is positively correlated with the storage volume and negatively correlated with the storage proportion and the storage speed. Exemplarily, the processor may calculate the storage margin time through an equation. The equation for calculating the storage margin time may be expressed as (1−storage proportion)*storage volume/storage speed.

The preset value is a time limit set to keep the storage space with an expected working margin. In some embodiments, the preset value may be set manually according to an actual need. The preset value is greater than the storage margin time.

In some embodiments, the processor may perform a time condition judgment based on the storage margin time, the preset value, and the target time period and determine the preset time period based on a judgment result. For example, the processor may determine whether the target time period is greater than a difference between the preset value and the storage margin time. In response to determining that the target time period is smaller than or equal to the difference, it indicates that the storage space has the expected working margin without deleting the preset historical data before the target time period, and the processor may determine the difference between the preset value and the storage margin time as the preset time period. In response to determining that the target time period is greater than the difference, it indicates that deleting the preset historical data before the target time period may cause a decrease in the storage speed of the storage space, but the storage speed may be decreased appropriately to ensure the accuracy of the separation of the coal and the gangue.

Considering the storage proportion, the storage speed, and the storage volume of the storage space when the preset time period is determined, which may ensure that the data stored in the database accurately reflects the feature of the coal gangue in the current mining area, and at the same time, ensure that the storage space has a sufficient working margin, so as to avoid the processor operation fault and production interruption caused by the insufficient storage space.

The database including the sample gray scale feature set is established, and the database is updated in real time or regularly based on the gray scale feature set generated by the actual sorting in the current mining area, so that the sample separation eigenvalue and the mapping set may be dynamically adjusted. The sample separation eigenvalue is obtained by performing statistics based on the sample gray scale feature set, and the mapping set is determined based on the sample gray scale feature set and the sample separation eigenvalue. In this way, the sample separation eigenvalue and the mapping set may be accurately matched with the separation feature of the coal and the second type of gangue in the current mining area, and the accuracy of the recognition and separation of the coal and the gangue may be improved.

It should be noted that the descriptions of the process 100, the process 200, and the process 300 are merely for the purpose of illustration, and not intended to limit the scope of application of the present disclosure. For those skilled in the art, various corrections and changes to the process may be made under the guidance of the present disclosure. However, these corrections and changes remain within the scope of the present disclosure.

FIG. 4 is an exemplary schematic diagram illustrating a tandem device for separating coal and gangue based on visible light and an X-ray according to some embodiments of the present disclosure. As shown in FIG. 4, the device 400 for separating coal and gangue includes an isolated lead plate 410, a tandem conveying path, a gangue discharging conveyor belt 424, an industrial visible light camera 430, an X-ray source 440, a removal device 450, a processor 460, a storage space 470, etc.

The isolated lead plate 410 may be used for isolation and protection. In some embodiments, the isolated lead plate 410 encloses to form a hollow inner cavity that provides mounting space for some or all of other device components. For example, the tandem conveying path may be arranged in the hollow inner cavity of the isolated lead plate 410.

The tandem conveying path may be used for feeding coal gangue conveying and discharging coal conveying, etc. In some embodiments, the tandem conveying path includes a feeding conveyor belt 421, a transition conveyor belt 422, a coal discharging conveyor belt 423, etc. The feeding conveyor belt, the transition conveyor belt, and the coal discharging conveyor belt are sequentially arranged in sequence along a traveling direction of the coal gangue in the hollow inner cavity of the isolated lead plate 410 to form the tandem conveying path. The feeding conveyor belt, the transition conveyor belt, and the coal discharging conveyor belt are connected to each other from head to tail, so that discharging ends and feeding end of the adjacent conveyor belts cooperate to convey materials.

The tandem conveying path is arranged in various ways in a vertical direction. In some embodiments, heights of the feeding conveyor belt, the transition conveyor belt, and the coal discharging conveyor belt sequentially decrease in the vertical direction. In some embodiments, the heights of the feeding conveyor belt, the transition conveyor belt, and the coal discharging conveyor belt are similar in the vertical direction.

The industrial visible light camera 430 may be used to acquire a visible light image. The device may include one or more industrial visible light cameras 430, which may be set according to an actual need. In some embodiments, the industrial visible light camera 430 is arranged above the feeding conveyor belt, and the industrial visible light camera 430 is capable of acquiring the visible light image of the feeding conveyor belt. For example, the coal gangue is conveyed via the feeding conveyor belt in a direction of the transition conveyor belt, and the industrial visible light camera 430 may acquire the visible light image of the feeding conveyor belt including the coal gangue.

The industrial visible light camera 430 may be used to obtain a suitable imaging effect by setting a lens orientation. In some embodiments, the lens of the industrial visible light camera 430 points to a feeding surface of the feeding conveyor belt. For example, the lens of the industrial visible light camera 430 points to the feeding surface of the feeding conveyor belt to make an optical axis of the industrial visible light camera 430 perpendicular to the feeding surface, so that on the visible light image acquired by the industrial visible light camera 430, the coal gangue in an edge region has little or essentially no deformation compared with the coal gangue in a central region.

In some embodiments, a dustproof glass plate is disposed at the lens of the industrial visible light camera 430. The dustproof glass plate is disposed, which reduces adhesion of a pollutant such as dust to the lens and ensures the sharpness of the visible light image acquired by the industrial visible light camera 430.

The industrial visible light camera 430 may communicate with the processor 460. In some embodiments, a signal output end of the industrial visible light camera 430 is connected to a PC. The industrial visible light camera 430 may upload the acquired visible light images to the processor 460 of the PC.

The X-ray source 440 may be used to acquire an X-ray image. In some embodiments, the X-ray source 440 is disposed on the transition conveyor belt and is capable of acquiring the X-ray image of the transition conveyor belt. For example, the processed coal gangue is conveyed to the transition conveyor belt via the feeding conveyor belt, and the X-ray source 410 may acquire the X-ray image of the transition conveyor belt including the processed coal gangue.

In some embodiments, the X-ray source 440 is an X-ray detector including an emission end and a receiving end. There may be one or more X-ray detectors, which may be set according to an actual need. The X-ray detectors may be used to obtain a suitable imaging effect by setting orientations of the emission end and the receiving end. In some embodiments, the emission end of the X-ray detector vertically points to the feeding surface of the transition conveyor belt, and the receiving end is located below the feeding surface of the transition conveyor belt. The emission end and the receiving end are arranged perpendicular to the feeding surface, so that on the X-ray image acquired by the X-ray detector, the coal gangue in the edge region has little or essentially no deformation compared with the coal gangue in the central region.

The X-ray source 440 may be in communication with the processor 460. In some embodiments, a signal output end of the X-ray source 440 is connected to the PC. The X-ray source 440 may upload the acquired X-ray image to the processor 460 of the PC.

The removal device 450 may be used to remove/separate gangue from the coal gangue. In some embodiments, there may be one or more removal devices 450 according to the actual application need. In some embodiments, the removal device 450 may include a first removal device 451 and a second removal device 452. The first removal device 451 may be disposed at the discharging end of the feeding conveyor belt, and the second removal device 452 may be disposed at the discharging end of the transition conveyor belt, which facilitates separating gangue in the coal gangue at the discharging end. In other embodiments, the first removal device 451 may be disposed in a middle section of the feeding conveyor belt, and/or the second removal device 452 may be disposed in a middle section of the transition conveyor belt.

The removal device 450 may achieve separation of the coal and gangue in various ways. In some embodiments, the removal device 450 removes gangue in the coal gangue by jetting. For example, the removal device 450 may be an air nozzle. In some embodiments, for the jet-type removal device, an airflow ejection path respectively intersects with a throwing path of the feeding conveyor belt or the transition conveyor belt to eject the gangue to a preset position. For example, the removal device may eject the gangue onto the gangue discharging conveyor belt located below the tandem conveying path by jetting.

In some embodiments, the removal device 450 may also separate the coal and the gangue by vibrating, spraying water column, etc.

The removal device 450 may be in communication with the processor 460. In some embodiments, the removal device 450 may receive an instruction from the processor 460 to remove/separate gangue in the coal gangue based on the instruction. For example, the first removal device 451 may receive a first instruction from the processor 460 to separate the first type of gangue. Based on the first instruction to separate the first type of gangue, the first removal device 451 may remove/separate the first type of gangue from the discharging end of the feeding conveyor belt by jetting. The second removal device 452 may receive a second instruction from the processor 460 to separate the second type of gangue. Based on the second instruction to separate the second type of gangue, the second removal device 452 may remove/separate the second type of gangue from the discharging end of the transition conveyor belt by jetting.

The gangue discharging conveyor belt may be used for discharging and conveying of the gangue. The gangue discharging conveyor belt may be set in a position to facilitate receiving and conveying the gangue. In some embodiments, the gangue discharging conveyor belt is disposed below the tandem conveying path in the vertical direction, and the gangue discharging conveyor belt is cooperatively set with the path of the removal device 450 removing/separating gangue in terms of position, so that the gangue discharging conveyor belt may receive the gangue removed/separated by the removal device 450.

The storage space 470 may be used to store data and/or information. In some embodiments, the storage space 470 may be used to store data and/or information obtained from the processor 460. In some embodiments, the storage space 470 may obtain the data and/or information through a network or directly from other components of the device 400 for separating coal and gangue (e.g., the industrial visible light camera 430 and/or the X-ray source 440). In some embodiments, the storage space 470 may include a mass storage, a removable storage, a volatile read-write memory, a read-only memory (ROM), or the like, or any combination thereof. In some embodiments, the storage space 470 may be implemented on a cloud platform. In some embodiments, the storage space 470 may be a component of the processor 460.

In some embodiments, the storage space 470 stores a database. In some embodiments, the database is configured to store a sample gray scale feature set of the sample coal and the sample gangue of at least one granularity level. In some embodiments, the database is further configured to receive the instruction from the processor 460, update the database based on a gray scale feature set of a current coal gangue uploaded by the processor 460, and delete preset historical data before a preset time period. In some embodiments, the database is further configured to store a sample separation eigenvalue, a mapping set, etc., uploaded by the processor 460. More descriptions regarding the database may be found in the related descriptions of FIG. 1.

The processor 460 may be used to perform the exemplary methods disclosed in one or more embodiments in the present disclosure. In some embodiments, the processor 460 may communicate directly or through a network with other components of the device 400 for separating coal and gangue (e.g., the industrial visible light camera 430, the X-ray source 440, and/or the storage space 470). In some embodiments, the processor 460 may include one or more processing engines (e.g., a single-chip processing engine or a multi-chip processing engine). In some embodiments, the processor 460 may be implemented on a cloud platform. In some embodiments, the processor 460 may be implemented by a PC or other type of workstation or terminal device.

The PC is one or more terminals used by a user. The PC may receive an instruction and data input by the user and interact with the processor 460, etc. to accomplish various operations such as data retrieval and data classification. In some embodiments, the PC may obtain data and/or information directly or through a network from other components of the device 400 for separating coal and gangue (e.g., the industrial visible light camera 430, the X-ray source 440, and/or the storage space 470). In some embodiments, the PC may also include a component such as an input device, an output device, etc. In some embodiments, the PC may transmit data with the processor 460, the storage space 470, etc. through a network. In some embodiments, the PC may be used by one or more users performing operations such as separation. In some embodiments, the PC may be a mobile device, a tablet computer, a laptop computer, a desktop computer, other devices with input and/or output functions, or any combination thereof.

In some embodiments, the processor 460 is configured to perform the methods of some embodiments of the present disclosure, including recognizing the first type of gangue in the coal gangue, controlling the removal device 450 to remove/separate the first type of gangue in the coal gangue, recognizing the second type of gangue in the processed coal gangue, and controlling the removal device 450 to remove/separate the coal and the second type of gangue. More descriptions may be found in FIGS. 1-3 and their related descriptions. In some embodiments, the processor 460 may be configured to execute steps S1-S8. In some embodiments, the processor 460 may be configured to execute steps S11-S18.

In some embodiments, the device 400 for separating coal and gangue further includes a microprocessor. The microprocessor is configured to determine and adjust a rate of the feeding conveyor belt and/or the transition conveyor belt.

In some embodiments, the microprocessor may be an integral part of the processor 460. In some embodiments, the microprocessor may be integrated on a control component of the tandem conveying path. In some embodiments, the microprocessor may be in communication with other components of the device 400 for separating coal and gangue. For example, the industrial visible light camera 430, the X-ray source 440, the feeding conveyor belt, and/or the transition conveyor belt.

In some embodiments, the microprocessor may determine a removal efficiency based on the visible light image, the X-ray image, and a quality of a finished product; and adjust, based on the removal efficiency, the rate of the feeding conveyor belt and/or the transition conveyor belt.

The quality of a finished product refers to a quality that characterizes a finished product in which gangue is removed. The quality of a finished product may be characterized by an amount of gangue remaining in the finished product. The finished product is a product formed after the first type of gangue is removed and the second type of gangue is removed in the coal gangue. In some embodiments, the quality of a finished product may be determined by manual inspection. For example, a preset area of the finished product may be sampled on the coal discharging conveyor belt and the quality of a finished product thereof may be obtained by manual inspection. The preset area may be determined based on an area covered by the X-ray image on the tandem conveying path.

In some embodiments, the microprocessor may obtain the visible light image from the industrial visible light camera 430 and obtain the X-ray image from the X-ray source 440.

In some embodiments, the visible light image and the X-ray image are images acquired at different times for a same batch of the coal gangue. The quality of a finished product is obtained by testing the finished product corresponding to the same batch of the coal gangue.

A matching relationship between the visible light image, the X-ray image, and the quality of a finished product may be determined in various ways. In some embodiments, the microprocessor may determine the matching relationship between the visible light image, the X-ray image, and the quality of a finished product based on the rate of the tandem conveying path, a spacing between the industrial visible light camera 430 and the X-ray source 440, and a spacing between the industrial visible light camera 430 the feeding end of the coal discharging conveyor belt.

Exemplarily, the microprocessor may obtain the visible light image from the industrial visible light camera 430. The microprocessor may calculate, based on the rate of the tandem conveying path, the spacing between the industrial visible light camera 430 and the X-ray source 440, and the spacing between the industrial visible light camera 430 and the feeding end of the coal discharging conveyor belt, a first elapsed time for the same batch of coal gangue to be conveyed from the industrial visible light camera 430 to the X-ray source 440. The microprocessor may also calculate, based on the rate of the tandem conveying path, the spacing between the industrial visible light camera 430 and the X-ray source 440, and the spacing between the industrial visible light camera 430 and the feeding end of the coal discharging conveyor belt, a second elapsed time for the same batch of the coal gangue to be conveyed from the industrial visible light camera 430 to the feeding end of the coal discharging conveyor belt. The microprocessor may control the X-ray source 440 to acquire the X-ray image of the same batch of coal gangue based on the first elapsed time, thereby determining the X-ray image that matches the visible light image. The microprocessor may generate a message notifying the manual inspection of the quality of a finished product based on the second elapsed time. For example, the notification message includes a sampling position, a sampling time, and a preset area to be sampled. The microprocessor may determine the quality of a finished product that matches the visible light image based on a result of the manual inspection uploaded by the user.

The removal efficiency refers to an ability to remove gangue per unit of time. For example, the removal efficiency may be a value between 0 and 1.

In some embodiments, the removal efficiency is related to a total amount of the removed first type of gangue, a total amount of the removed second type of gangue, an amount of missed gangue, and the quality of a finished product. The total amount of the removed first type of gangue refers to a total amount of the first type of gangue that should be removed. The total amount of the removed second type of gangue is a total amount of the second type of gangue that should be removed. The amount of missed gangue refers to an amount of the first type of gangue that should be removed but is not actually removed. In some embodiments, the removal efficiency is positively correlated with the total amount of the removed first type of gangue and the total amount of the removed second type of gangue, and is negatively correlated with the amount of missed gangue and the quality of a finished product. For example, the microprocessor may obtain the removal efficiency by calculating. The removal efficiency may be expressed as 1−quality of a finished product/(total amount of the removed first type of gangue+total amount of the removed second type of gangue−amount of missed gangue).

In some embodiments, for the same batch of coal gangue, the microprocessor may recognize the first type of gangue in the coal gangue based on the visible light image and determine the total amount of the removed first type of gangue based on the recognition result of the first type of gangue. It should be understood that a recognized amount of the first type of gangue (or a count of target regions determined as the first type of gangue) is the total amount of the first type of gangue that should be removed. More descriptions regarding the recognizing the first type of gangue in the coal gangue based on the visible light image may be found elsewhere in the present disclosure, e.g., the related descriptions of the operations 110 to 130 of FIG. 1 and the related descriptions of FIG. 2.

In some embodiments, for the same batch of coal gangue, the microprocessor may recognize the second type of gangue in the processed coal gangue based on the X-ray image and determine the total amount of the removed second type of gangue based on the recognition result of the second type of gangue. It should be understood that a recognized amount of the second type of gangue (or a count of candidate regions determined as the second type of gangue) is the total amount of the second type of gangue that should be removed. More descriptions regarding the recognizing the second type of gangue based on the X-ray image may be found elsewhere in the present disclosure, e.g., the related descriptions of the operations 140 to 150 of FIG. 1.

In some embodiments, for the same batch of coal gangue, the microprocessor may determine, based on the X-ray image, the gray scale feature set of the processed coal gangue; and determine, based on the gray scale feature set of the processed coal gangue and an image feature set of the first type of gangue, the amount of missed gangue through similarity calculation. The image feature set of the first type of gangue may be determined based on an image feature set of the coal gangue and the recognition result of the first type of gangue, and the image feature set of the coal gangue may be determined based on the visible light image. More descriptions regarding the determining the image feature set of the coal gangue and determining the gray scale feature set of the processed coal gangue may be found elsewhere in the present disclosure, e.g., in the related descriptions of the operations 110 and 140 of FIG. 1.

Exemplarily, for an X-ray image of each candidate region in the gray scale feature set of the processed coal gangue, the microprocessor may obtain an image similarity by performing the similarity calculation (e.g., through a Mean Squared Error (MSE) calculation model or a Peak Signal-to-Noise Ratio (PSNR) model) using the X-ray image and the image feature set of the first type of gangue. The image similarity may be a value between 0 and 1. When the image similarity is greater than a preset threshold (e.g., 0.7, 0.75, 0.8, or 0.85), the microprocessor may determine a candidate region corresponding to the image similarity as the missed gangue and determine the amount of missed gangue.

In some embodiments, the removal efficiency includes a first removal efficiency and a second removal efficiency. The first removal efficiency refers to an ability to remove the first type of gangue per unit of time. The second removal efficiency refers to an ability to remove the second type of gangue per unit of time.

In some embodiments, the first removal efficiency is related to the total amount of removed first type of gangue and the amount of missed gangue. In some embodiments, the first removal efficiency is positively correlated with the total amount of removed first type of gangue, and is negatively correlated with the amount of missed gangue. For example, the microprocessor may obtain the first removal efficiency by calculating. The first removal efficiency may be expressed as 1−(amount of missed gangue/total amount of the removed first type of gangue).

In some embodiments, the second removal efficiency is related to the total amount of the removed second type of gangue and the quality of a finished product. In some embodiments, the second removal efficiency is positively related to the total amount of the removed second type of gangue, and is negatively related to the quality of a finished product. For example, the microprocessor may obtain the second removal efficiency by calculating. The second removal efficiency may be expressed as 1−(quality of a finished product/total amount of the removed second type of gangue).

In some embodiments, the removal efficiency is negatively correlated with a rate of a conveyor belt to some extent. The microprocessor may determine whether the rate of the feeding conveyor belt and/or the rate of the transition conveyor belt is too fast based on the removal efficiency and adjust the rate of the feeding conveyor belt and/or the rate of the transition conveyor belt based on the determination result. Exemplarily, the microprocessor may determine whether the removal efficiency is less than an efficiency threshold (e.g., 0.75, 0.8, or 0.85). When the microprocessor determines that the removal efficiency is less than the efficiency threshold, it may be considered that the rate of the feeding conveyor belt and the rate of the transition conveyor belt is too fast and need to be reduced. The efficiency threshold may be set manually according to an actual application need. In response to determining that the removal efficiency is less than the efficiency threshold, the microprocessor may determine adjusted rates of the two conveyor belts by calculating, respectively. The adjusted rates may be expressed as k*current rate/(1+removal efficiency), where k denotes a coefficient preset empirically, and the current rate denotes a current rate of the feeding conveyor belt or a current rate of the transition conveyor belt.

In some embodiments, the microprocessor may determine whether the rate of the feeding conveyor belt is too fast based on the first removal efficiency and adjust the rate of the feeding conveyor belt based on the determination result. Exemplarily, the microprocessor may determine whether the first removal efficiency is less than a first efficiency threshold (e.g., 0.75, 0.8, or 0.85). When the microprocessor determines that the first removal efficiency is less than the first efficiency threshold, it may be considered that the rate of the feeding conveyor belt is too fast and needs to be reduced. The first efficiency threshold may be set manually according to an actual application need. In response to determining that the first removal efficiency is less than the first efficiency threshold, the microprocessor may determine an adjusted rate of the feeding conveyor belt by calculating. The adjusted rate may be expressed as k*current rate/(1+first removal efficiency), where k denotes a coefficient preset empirically, and the current rate denotes a current rate of the feeding conveyor belt.

In some embodiments, the microprocessor may determine, based on the second removal efficiency, whether the rate of the transition conveyor belt is too fast, and adjust the rate of the transition conveyor belt based on the determination result. Exemplarily, the microprocessor may determine whether the second removal efficiency is less than a second efficiency threshold (e.g., 0.75, 0.8, or 0.85). When the microprocessor determines that the second removal efficiency is less than the second efficiency threshold, it may be considered that the rate of the transition conveyor belt is too fast and needs to be reduced. The second efficiency threshold may be set manually according to an actual application need. In response to determining that the second removal efficiency is less than the second efficiency threshold, the microprocessor may determine an adjusted rate of the transition conveyor belt by calculating. The adjusted rate may be expressed as k*current rate/(1+second removal efficiency), where k denotes a coefficient preset empirically, and the current rate denotes a current rate of the transition conveyor belt.

The microprocessor adjusts the rate of the conveyor belt based on the removal efficiency, which may control the quality of a finished coal product in an effective and timely manner, so that the integrated process of sorting provided by the device for separating coal and gangue may have a better quality of sorting and sorting efficiency.

In some embodiments, the device for separating coal and gangue further includes auxiliary rollers disposed below conveying surfaces of the feeding conveyor belt, the transition conveyor belt, the coal discharging conveyor belt, and the gangue discharging conveyor belt. The auxiliary rollers are used to support the conveyor belts, which improves the structural stability and conveying efficiency of the conveyor belts.

FIG. 5 is a schematic diagram illustrating an exemplary structure of a tandem device for separating coal and gangue based on visible light and an X-ray according to some other embodiments of the present disclosure.

As shown in FIG. 5, the device 500 for separating coal and gangue includes an isolated lead plate 520, an industrial visible light camera 510, a plurality of conveyor belts, a first air nozzle 571, a second air nozzle 572, an X-ray detector 560 constituting an X-ray source and corresponding support bases and brackets.

When assembled, the plurality of conveyor belts includes a feeding conveyor belt 530, a transition conveyor belt 540, a gangue discharging conveyor belt 580, and a coal discharging conveyor belt 550. The transition conveyor belt 540 and the coal discharging conveyor belt 550 are above the gangue discharging conveyor belt 580. At the same time, all the conveyor belts and even ancillary accessories are surrounded by the isolated lead plate 520, which is fixed by an inner fixing frame. A boundary dose rate of the isolated lead plate 520 is required to be controlled within a standard range.

Meanwhile, the feeding conveyor belt 530 is erected on the support base. The four fulcrums of the support base are located on roller supports at two ends of the feeding conveyor belt 530. The roller supports include conveyor belt rollers. Below the feeding conveyor belt 530, five auxiliary rollers 590 are mounted close to the belt, which plays the role of positioning the belt and stabilizing the material.

A bracket is disposed above the feeding conveyor belt 530. The bracket is of a cubic structure, and the top of the bracket is provided with the industrial visible light camera 510. The bracket is connected to the inner fixing frame of the isolated lead plate 520. A dustproof glass plate is disposed below the industrial visible light camera 510 to prevent a camera lens from being contaminated by dust. The discharging end of the feeding conveyor belt 530 is provided with the first air nozzle 571. After the first air nozzle 571 therein receives a first separation instruction to separate the first type of gangue issued by the processor, the first air nozzle 571 emits an air stream from to act on a surface of the first type of gangue when the mixture of coal gangue is in a flat throwing motion. The first type of gangue receives a downward thrust in the air and falls on the gangue discharging conveyor belt 580 below.

The transition conveyor belt 540 is also fixed to the support base. An emission end of the X-ray detector 560 is disposed above a feeding surface of the transition conveyor belt 540, and a receiving end of the X-ray detector 560 is disposed below the feeding surface of the transition conveyor belt 540. After scanning of the industrial visible light camera 510 and the separation of the first type of gangue are performed on the material, the remaining processed coal gangue falls on the transition conveyor belt 540 and is sorted for the second time through the X-ray detector 560. After the second sorting, the second air nozzle 572 at the discharging end of the transition conveyor belt 540 receives a second separation instruction to separate the first type of gangue issued by the processor. When the second type of gangue passes through the discharging end of the transition conveyor belt 540, the second air nozzle 572 make the second type of gangue be blown out and fall on the gangue discharging conveyor belt 580 below, and the coal falls on the coal discharging conveyor belt 550. Finally, the process for separating coal and gangue of a specified granularity level is completed.

Embodiment 1

The embodiment provides a tandem method for separating coal and gangue based on visible light and an X-ray. The method may be executed by a processor and includes the following operations.

In S1, obtaining a visible light image by an industrial visible light camera taking coal gangue.

In S2, extracting an image feature set of the coal gangue of a plurality of scales based on processing of the visible light image by a back-end personal computer (PC); and performing multi-level processing on the visible light image entering the PC based on a first preset algorithm, the first preset algorithm including the equation (1). More descriptions may be found below.

In S3, determining a target region through a central region proposal network based on the visible light image.

In S4, recognizing the coal gangue based on a convolutional neural network (CNN) model and sending a first separation instruction to a first air nozzle to control the first air nozzle to remove large gangue in the coal gangue.

The convolutional neural network model may also be referred to as a recognition model. More descriptions may be found in the related descriptions of FIG. 1.

In S5, performing imaging on the coal gangue after the large gangue is removed based on an X-ray source;

The coal gangue after the large gangue is removed may also be referred to as the processed coal gangue. More descriptions may be found in the related descriptions of FIG. 1.

In S6, extracting a target image based on the PC and determining a gray scale value corresponding to the target image, the target image including a high-energy imaging image and a low-energy imaging image.

The target image may also be referred to as an X-ray image. The gray scale value corresponding to the target image may also be referred to as the gray scale feature set of the processed coal gangue. More descriptions may be found in the related descriptions of FIG. 1.

In S7, obtaining samples of coal and gangue of different granularity levels by performing sampling based on a coal quality of a current mining area; obtaining an image gray scale value of each sample of coal and gangue based on the step S5 and the step S6, establishing a database, and obtaining a separation threshold of coal and gangue of each granularity level of the current mining area by performing statistics; and matching, based on the separation threshold, the image gray scale value of the sample of the coal and gangue to form a mapping set, and storing the database in a storage space.

The separation threshold may also be referred to as the sample separation eigenvalue, which can be described in FIG. 1 for more information. More descriptions regarding the database, the mapping set, and the storage space may be found in the related descriptions of FIGS. 1-5.

In S8, removing the large gangue through the first air nozzle by executing the steps S1-S4, obtaining a gray scale value of subsequent coal gangue by executing the step S5 and the step S6, importing the gray scale value of the subsequent coal gangue into the mapping set of the step S7, and sending a second separation instruction to a second air nozzle to control the second air nozzle to subsequently separate coal and gangue.

In some embodiments, the step S3 includes the following operations.

In 1), obtaining continuous M×N small regions with a total of M rows and N columns by segmenting the visible light image, each small region of the M×N small regions being 50×50 pixels without overlap and blankness, and executing the steps 2)-4) for the each small region;

In 2), determining a total gray scale value and a gray scale mean value of a central region of 30×30 pixels based on a second preset algorithm. The total gray scale value is expressed as $C_{sum\_gray}$, and the gray scale mean value is expressed as $C_{average\_gray}$. The second preset algorithm refers to a manner for determining the total gray scale value and the gray scale mean value of the central region that is preset in advance. The second preset algorithm includes equation (2). More descriptions may be found below.

In 3), obtaining, based on a third preset algorithm, a total gray scale value $E_{sum\_gray}$ and a gray scale mean value $E_{average\_gray}$ of a circular region E. The third preset algorithm refers to a manner for determining the total gray scale value and the gray scale mean value of the circular region that is preset in advance. The third preset algorithm includes equation (3). More descriptions may be found below.

In 4), obtaining, based on a fourth preset algorithm, a gray scale value of a region surrounded by an $m^{th}$ row and an $n^{th}$ column. The fourth preset algorithm refers to a manner for determining the gray scale value of a region surrounded by an $m^{th}$ row and an $n^{th}$ column that is preset in advance. The fourth preset algorithm includes equation (4). More descriptions may be found below.

In 5), determining, based on a fifth preset algorithm, a gray scale mean value of the entire visible light image. The fifth preset algorithm refers to a manner for determining the gray scale mean value of the entire visible light image that is preset in advance. The fifth preset algorithm includes equation (5). More descriptions may be found below.

In some embodiments, the step S4 includes: inputting a multi-level image performed with the multi-level processing obtained in the step S2 into the CNN model for classification; establishing a convolutional layer of the CNN model, the equation of the convolutional layer being equation (6); establishing a tiling layer, the equation of the tiling layer being equation (7); obtaining an activation function ReLU (x) of an activation layer, the equation of the activation function being equation (8); and establishing a classification layer using a Sigmoid probability function, an output of the Sigmoid probability function being in a range of 0 to 1.

In some embodiments, in the step S6, the equation for determining the gray scale value R is equation (9).

In some embodiments, the step S7 includes: a, obtaining a target sample, the target sample including ten pieces of coal and ten pieces of gangue of each granularity level in a range of 10 mm-30 mm and a gradient of variation of 2 mm; b, determining a gray scale value of an image of the target sample, establishing the database, and obtaining the separation threshold of coal and gangue of the each granularity level of the current mining area by performing statistics; and c, feeding back a gray scale value of sorted coal and gangue to the database in the step b in real time in a sorting process, updating the database continuously, and deleting data of previous Z hours.

The embodiment provides a specific implementation of the tandem method for separating coal and gangue based on visible light and an X-ray, which may be realized using the device for separating coal and gangue and includes the following operations.

In S11, first recognition. The industrial visible light camera takes an image of the coal gangue.

There are three kinds of gangue blocks in the coal gangue mixture of large gangue block, medium gangue block, and small gangue block. The industrial visible light camera continuously took the images of the gangue blocks through the feeding conveyor belt together, and the visible light images were saved and transmitted into the PC for processing. Visible light has poor recognition accuracy for small and medium coal and gangue since a surface area of the small and medium gangue is relatively small, and there is an impact of surface dust. However, the large gangue is relatively easy to be recognized.

In S12, processing of the visible light image. The image feature set of the coal gangue of a plurality of scales is extracted based on the processing of the visible light image by a back-end personal computer (PC).

The multi-level processing was performed on the visible light image entering the PC, which was realized using the Gaussian pyramid principle. The image feature set may be determined by the following equation (1):

$$K_{l+1}(i, j) = \sum_{m=-2}^{2}\sum_{n=-2}^{2}p(m, n)K_l(2i - m, 2i - n), \qquad (1)$$

where $K_l(*)$ denotes an $l^{th}$ image, $K_{l+1}(*)$ denotes a $(l+1)^{th}$ image, p(m, n) denotes a 5×5 pixel window function with a low-pass filter property as a Gaussian convolution kernel, m denotes a function value in an x-axis direction in a Gaussian convolution kernel window, n denotes a function value in a y-axis direction in the Gaussian convolution kernel window, and i and j denote pixel values on the x-axis and the y-axis of the image.

In S13, determining the target region. The target region is boxed through a central regional proposal network (C-RPN), which includes the steps 1)-5).

1), segmenting each visible light image into consecutive M×N image sub-regions with M rows and N columns. Each image sub-region is 50×50 pixels, and there is no overlap and blankness between neighboring image sub-regions.

FIG. 6 is a schematic diagram illustrating division of an image sub-region according to some embodiments of the present disclosure. As shown in FIG. 6, a size of the central region (C) is 30×30 pixels. An overlay size of the central region and the blank region is 40×40 pixels. A size of the circular region (E) is image sub-region-central region-blank region. Steps 2) to 4) are performed on each image sub-region.

In 2), determining a total gray scale value $C_{sum\_gray}$ of the central region of 30×30 pixels; and determining a first gray scale mean value $C_{average\_gray}$ of the central region. The total gray scale value and the first gray scale mean value of the central region are determined by the following equation (2):

$$\begin{cases} C_{sum\_gray} = \sum_{i=11,j=11}^{40,40} I(i, j) \\ C_{average\_gray} = C_{sum\_gary}/PX_C = C_{sum\_gray}/900 \end{cases}, \qquad (2)$$

where I(*) denotes a pixel matrix on a 50×50 pixel image sub-region; and $PX_C$ denotes a count of pixels in the central region. I and j are used to denote a certain pixel on the image sub-region. Pixels on the image sub-region may be represented starting from the first one in the upper left corner and moving to the right and down in order. The processor may also represent the pixels in any other feasible ways. The expression of the corresponding equation may be adjusted accordingly.

In 3), obtaining a total gray scale value $E_{sum\_gray}$ of the circular region shown in FIG. 6; and obtaining a second gray scale mean value $E_{average\_gray}$ of the circular region. The total gray scale value and the second gray scale mean value of the circular region are determined by the following equation (3):

$$\begin{cases} E_{sum\_gray} = \sum_{i=1,j=1}^{50,50} I(i,j) - \sum_{i=6,j=6}^{45,45} I(i,j) \\ E_{average\_gray} = E_{sum\_gray}/PX_E = E_{sum\_gray}/900 \end{cases} \quad (3)$$

where I(*) denotes the pixel matrix on the 50×50 pixel image sub-region; and $PX_E$ denotes a count of pixels in the circular region.

In 4), obtaining a gray scale value of a region surrounded by an $m^{th}$ row and an $n^{th}$ column through the following equation:

$$\begin{cases} E - C(m,n) = C_{average\_gray} - E_{average\_gray} \\ m \leq M \\ n \leq N \end{cases} \quad (4)$$

where E-C(m, n) is an abbreviation of Encircle-City(m, n) and denotes a gray scale mean value of the region surrounded by the $m^{th}$ row and the $n^{th}$ column, E denotes the circular region, and C denotes the central region. The central region (C) includes the gray scale value of the circular region (E) as the background color, so the gray scale mean value of the small region may be obtained by subtracting $E_{average\_gray}$ from $C_{average\_gray}$ in the equation (4).

In 5), segmenting each image into consecutive M×N small regions in step 1), determining a gray scale mean value of each small region, and determining a gray scale mean value of the entire image through the following equation:

$$\begin{cases} \text{Average\_gray} = \dfrac{\sum_{m=1,n=1}^{M,N} \text{Encircle} - \text{city}(m,n)}{(M \times N)} \\ \text{Length} = \text{find} - \text{length}(\text{Encircle} - \text{city} > \text{Average\_gray}) \\ \text{Encircle} - \text{city}_{eigenvalue} = \text{Length}/(M \times N) \end{cases} \quad (5)$$

where Encircle-City denotes an entire region matrix of a region enclosed by the circular region and the central region; Average_gray denotes a gray scale mean value of the entire region matrix Encircle-city; Encircle-city (m, n) denotes the gray scale mean value of the region surrounded by the $m^{th}$ row and the $n^{th}$ column; Length denotes a count of elements in the entire region matrix Encircle-city that are larger than Average_gray, and Length is obtained by a function of find-length; and Encircle-city$_{eigenvalue}$ denotes an entire eigenvalue of Encircle-city (dimensionless parameter).

In some embodiments, the target region that is the visible light image of coal gangue is input to the PC, and the PC divides M×N regions. Each small region needs to obtain an eigenvalue corresponding to the small region using the manner, and the processor sorts according to the eigenvalue.

In S14, target recognition. Large coal and the first type of gangue are recognized using a convolutional neural network (CNN) model.

The image feature set of the coal gangue obtained in the step S12 is output to a convolutional neural network (CNN) model for classification to recognize the first type of gangue in the coal gangue. The CNN model is constructed as follows.

First, a convolutional layer of the CNN model is established, and the convolutional layer is determined by the following equation (6):

$$O_j = g\left(\sum_{i=1}^{n} M_i \times km_{ij} + B_j\right), \quad (6)$$

where $O_j$ denotes a convolution kernel of a j-dimension; g(*) denotes a convolution function; $M_i$ denotes an input matrix; $km_{ij}$ denotes an i×j kernel matrix; and $B_j$ denotes an offset value.

In some embodiments, a tiling layer is established, and the tiling layer is determined by the following equation (7):

$$Q_i = \gamma \hat{x}_i + \beta \hat{x}_i = \frac{1}{\sigma_i}(x_i - U_i), \quad (7)$$

where Q denotes a one-dimensional feature vector; γ and β denote learnable variables; x denotes a feature; σ denotes a standard deviation; U denotes a mean; and $\hat{x}_i$ is a standard deviation.

In some embodiments, an activation function ReLU(x) of an activation layer is established. The activation function is determined by the following equation (8):

$$ReLU(x) = \max(x, 0) = \begin{cases} 0, & x < 0 \\ x, & x \geq 0 \end{cases}, \quad (8)$$

where max(x,0) denotes a function that takes a larger value and turns all negative values of an input x into positive values.

In some embodiments, a classification layer is established using a Sigmoid probability function. An output of the Sigmoid probability function is in a range of 0 to 1, which represents a probability.

In S15, second recognition. The processed coal gangue is imaged using an X-ray source.

As shown in FIG. 5, after the coal gangue is sorted by visible light, the first type of gangue is blown onto the gangue discharging conveyor belt 580 by the first air nozzle 571. The processed coal gangue (i.e., the remaining coal and gangue) is thrown to move to the transition conveyor belt 540 and sorted again when passing through the X-ray detector 560. The emission end of the X-ray detector 560 emits X-rays that penetrate the processed coal gangue, and the X-rays themselves attenuate. The receiving end of the X-ray detector 560 below detects and converts the X-rays into digital signals, which are ultimately transmitted to the PC.

In S16, extraction of the gray level feature set of the processed coal gangue. The gray scale value of the X-ray image is extracted using the PC.

After the processed coal gangue is imaged by X-rays, a high-energy imaging image and a low-energy image are obtained, and the gray scale values are extracted, respectively. The gray scale value is denoted as R and is determined by the following equation (9):

$$R = \frac{\mu_l^*}{\mu_h^*} = \frac{\ln(I_{ol}/I_l)}{\ln(I_{ol}/I_h)}, \quad (9)$$

$\mu_l^*$ denotes a mass absorption coefficient of a low-energy region; $\mu_h^*$ denotes a mass absorption coefficient of a high-energy region; $I_{ol}$ denotes an intensity of the low-energy region before the X-ray transmits an object; $I_{oh}$ denotes an intensity of the high-energy region before the X-ray transmits the object; $I_l$ denotes an intensity of the low-energy region before the X-ray transmits the object; and $I_h$ denotes an intensity of the high-energy region after the X-ray transmits the object.

In S17, obtaining a mapping set.

obtaining samples of coal and gangue of different granularity levels by performing sampling based on a coal quality of a current mining area; obtaining an image gray scale value of each sample of coal and gangue based on the step S15 and the step S16, establishing a database, and obtaining a separation threshold of coal and gangue of each granularity level of the current mining area by performing statistics; and matching, based on the separation threshold, the image gray scale value of the sample of the coal and gangue to form a mapping set, and storing the database in a storage space.

S18, removing the large gangue by executing the steps S11-S14 in order, obtaining a gray scale value of subsequent coal gangue by executing the step S15 and the step S16, importing the gray scale value of the subsequent coal gangue into the mapping set of the step S17 to subsequently separate coal and gangue.

Before the actual sorting, statistics is performed on the sample separation eigenvalue based on a coal quality of a current mining area, a database is established, and a mapping set is formed. The specific manner is as follows.

In a, ten pieces of coal and ten pieces of gangue of each granularity level in a range of 10 mm-30 mm and a gradient of variation of 2 mm are selected as the sample coal and the sample gangue.

In b, the gray scale value of the X-ray image of each sample coal and sample gangue is calculated, and the database is established. The sample separation eigenvalue of each granularity level in the current mining area is obtained by performing statistics based on the database.

FIG. 7 is a graph of distribution of gray scale values of coal and gangue according to some embodiments of the present disclosure. The block coal in FIG. 7 refers to coal. Referring to FIG. 7, the statistics of the sample separation eigenvalues is illustrated. As shown in FIG. 7, coal and gangue may be distinguished when the sample separation eigenvalue is 1.3.

The X-ray images and gray scale values of the sample coal and the sample gangue of each granularity level may be matched based on the statistical sample separation eigenvalue to form the mapping set.

In c, in the sorting process, the gray scale values of the sorted coal and the second type of gangue are fed back to the database in the step b in real time, the database is continuously updated, and data of 10 hours before a current time point may be deleted.

Figure 8:
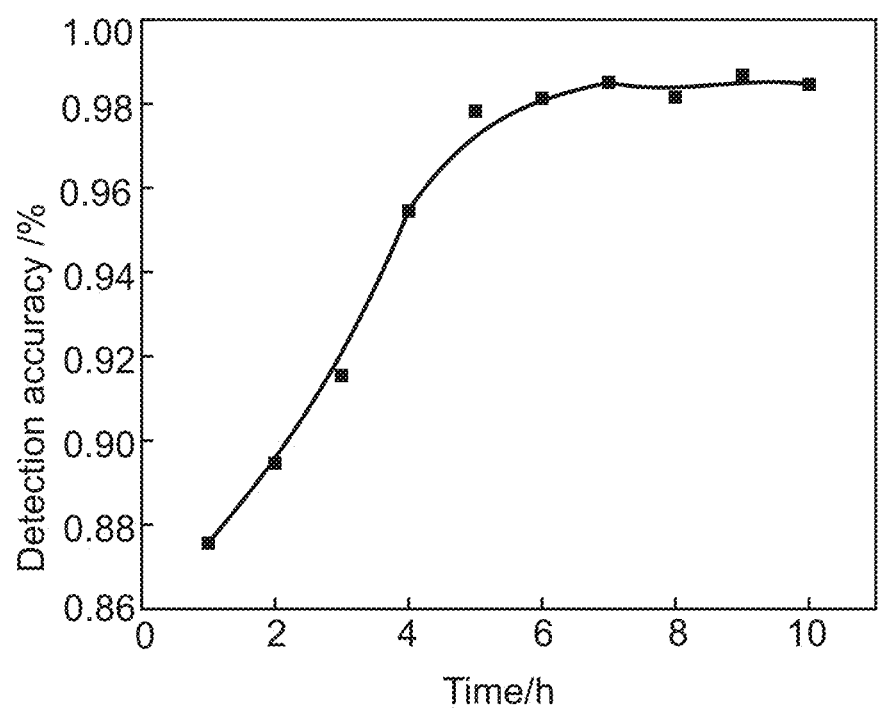
FIG. 8 is a graph of a linear relationship between a time and a detection accuracy of a method for separating coal and gangue according to some embodiments of the present disclosure.

FIG. 8 is a graph of a linear relationship between a time and a detection accuracy of a method for separating coal and gangue according to some embodiments of the present disclosure. The detection accuracy of FIG. 8 is obtained through online detection of coal gangue during the experiment. As can be seen from FIG. 8, the detection and separation accuracy of coal and gangue may be maintained at over 98% using the method for separating coal and gangue according to some embodiments of the present disclosure, which achieves significant results.

In the present disclosure, coal gangue is separated using visible light recognition and X-ray recognition in tandem and the method for separating coal and gangue is combined, which solves the problem that the visible light has a low recognition accuracy for small and medium coal and gangue covered with dust on the surface and the problem that X-rays has a low recognition accuracy for large coal gangue. Specifically, when working, a surface area of the large gangue (e.g., greater than 50 mm) is large, and the probability of dust adhering to the surface area is low. Therefore, the large gangue is first selected using the visible light. Subsequently, the remaining small and medium gangue is selected using X-ray recognition, which realizes the integrated underground sorting process from feeding to coal gangue output. The overall process is compact and well laid out, especially suitable for underground tunnel structures.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Furthermore, unless explicitly stated in the claims, the order of processing elements and sequences, the use of alphanumeric, or the use of other names described in the present disclosure is not intended to limit the order of the processes and methods of the present disclosure. While the above disclosure discusses some presently believed useful embodiments of the invention by way of various examples, it is to be understood that such details are for purposes of illustration only and that the appended claims are not limited to the disclosed embodiments, but on the contrary, the claims are intended to cover all modifications and equivalent combinations that come within the spirit and scope of the embodiments of the present disclosure. For example, although the implementation of various components described above may be embodied in a hardware device, it may also be implemented as a software only solution, e.g., an installation on an existing server or mobile device.

Finally, it should be understood that the embodiments described in the present disclosure are only configured to illustrate the principles of the embodiments of the present disclosure. Other modifications are also possible within the scope of the present disclosure. Therefore, as an example and not a limitation, alternative configurations of the embodiments of the present disclosure may be regarded as consistent with the teaching of the present disclosure. Correspondingly, the embodiments of the present disclosure are not limited to the embodiments clearly introduced and described in the present disclosure.

What is claimed is:

1. A tandem method for separating coal and gangue based on visible light and an X-ray, executed by a processor, comprising:
   S1, obtaining a visible light image by an industrial visible light camera taking coal gangue;
   S2, extracting an image feature set of the coal gangue of a plurality of scales based on processing of the visible light image by a back-end personal computer (PC); and
   performing multi-level processing on the visible light image entering the PC based on a first preset algorithm, the first preset algorithm including:

$$K_{l+1}(i, j) = \sum_{m=-2}^{2}\sum_{n=-2}^{2} p(m, n)K_l(2i-m, 2i-n),$$

where $K_l(*)$ denotes an $l^{th}$ image, $K_{l+1}(*)$ denotes a $(l+1)^{th}$ image,
   p(m, n) denotes a 5×5 pixel window function with a low-pass filter property as a Gaussian convolution kernel,
   m denotes a function value in an x-axis direction in a Gaussian convolution kernel window, n denotes a function value in a y-axis direction in the Gaussian convolution kernel window, and i and j denote pixel values on the x-axis and the y-axis of the image;
   S3, determining a target region through a central region proposal network based on the visible light image;
   S4, recognizing the coal gangue based on a convolutional neural network (CNN) model and sending a first separation instruction to a first air nozzle to control the first air nozzle to remove large gangue in the coal gangue;
   S5, performing imaging on the coal gangue after the large gangue is removed based on an X-ray source;
   S6, extracting a target image based on the PC and determining a gray scale value corresponding to the target image, the target image including a high-energy imaging image and a low-energy imaging image;
   S7, obtaining samples of coal and gangue of different granularity levels by performing sampling based on a coal quality of a current mining area; obtaining an image gray scale value of each sample of coal and gangue based on the step S5 and the step S6, establishing a database, and obtaining a separation threshold of coal and gangue of each granularity level of the current mining area by performing statistics; and matching, based on the separation threshold, the image gray scale value of the sample of the coal and gangue to form a mapping set, and storing the database in a storage space; and
   S8, removing the large gangue through the first air nozzle by executing the steps S1-S4, obtaining a gray scale value of subsequent coal gangue by executing the step S5 and the step S6, importing the gray scale value of the subsequent coal gangue into the mapping set of the step S7, and sending a second separation instruction to a second air nozzle to control the second air nozzle to subsequently separate coal and gangue.

2. The method of claim 1, wherein the step S3 includes:
   1), obtaining continuous M×N small regions with a total of M rows and N columns by segmenting the visible light image, each small region of the M×N small regions being 50×50 pixels without overlap and blankness, and executing the steps 2)-4) for the each small region;
   2), determining a total gray scale value and a gray scale mean value of a central region of 30×30 pixels based on a second preset algorithm, wherein the total gray scale value is expressed as $C_{sum\_gray}$, the gray scale mean value is expressed as $C_{average\_gray}$, and the second preset algorithm is:

$$\begin{cases} C_{sum\_gary} = \sum_{i=11, j=11}^{40,40} I(i, j) \\ C_{average\_gary} = C_{sum\_gary}/900 \end{cases},$$

where $I(*)$ denotes a pixel matrix of the 50×50 pixel region;
   3) Obtaining, based on a third preset algorithm, a total gray scale value $E_{sum\_gray}$ and a gray scale mean value $E_{average\_gray}$ of a circular region E, the third preset algorithm being:

$$\begin{cases} E_{sum\_gary} = \sum_{i=1, j=1}^{50,50} I(i, j) - \sum_{i=6, j=6}^{45,45} I(i, j) \\ E_{average\_gary} = E_{sum\_gary}/900 \end{cases};$$

4), obtaining, based on a fourth preset algorithm, a gray scale value of a region surrounded by an $m^{th}$ row and an $n^{th}$ column, the fourth preset algorithm being:

$$\begin{cases} E - C(m, n) = C_{average\_gary} - E_{average\_gary} \\ m \leq M \\ n \leq N \end{cases},$$

where E-C(m, n) is an abbreviation of Encircle-City(m, n) and denotes a gray scale mean value of the region surrounded by the $m^{th}$ row and the $n^{th}$ column, E denotes the circular region, and C denotes the central region; and
   5), determining, based on a fifth preset algorithm, a gray scale mean value of the entire visible light image, the fifth preset algorithm being:

$$\begin{cases} \text{Average\_gray} = \dfrac{\sum_{m=1,n=1}^{M,N} \text{Encircle} - \text{city}(m, n)}{(M \times N)} \\ \text{Length} = \text{find-length}(\text{Encircle} - \text{city} > \text{Average\_gray}) \\ \text{Encircle-city}_{eigenvalue} = \text{Length}/(M \times N) \end{cases},$$

where Encircle-City denotes an entire region matrix of a region enclosed by the circular region and the central region; Average_gray denotes a gray scale mean value of the entire region matrix Encircle-city; Encircle-city (m, n) denotes the gray scale mean value of the region surrounded by the $m^{th}$ row and the $n^{th}$ column; Length denotes a count of elements in the entire region matrix Encircle-city that are larger than Average_gray, and Length is obtained by a function of find-length; and Encircle-city$_{eigenvalue}$ denotes an entire eigenvalue of Encircle-city.

3. The method of claim 2, wherein the step S4 includes:
   inputting a multi-level image performed with the multi-level processing obtained in the step S2 into the CNN model for classification;

establishing a convolutional layer of the CNN model, an equation of the convolutional layer being:

$$O_j = g\left(\sum_{i=1}^{n} M_i \times km_{ij} + B_j\right),$$

where $O_j$ denotes a convolution kernel of a j-dimension;
g(*) denotes a convolution function;
$M_i$ denotes an input matrix;
$km_{ij}$ denotes an i×j kernel matrix; and
$B_j$ denotes an offset value;
establishing a tiling layer, an equation of the tiling layer being:

$$Q_i = \gamma \hat{x}_i + \beta \hat{x}_i = \frac{1}{\sigma_i}(x_i - U_i),$$

where Q denotes a one-dimensional feature vector;
γ and β denote learnable variables;
x denotes a feature;
σ denotes a standard deviation;
U denotes a mean; and
$\hat{x}_i$ is a standard deviation;
obtaining an activation function ReLU(x) of an activation layer, an equation of the activation function being:

$$ReLU(x) = \max(x, 0) = \begin{cases} 0, & x < 0 \\ x, & x \geq 0 \end{cases},$$

where max(x,0) denotes a function that takes a larger value and turns all negative values of an input x into positive values; and
establishing a classification layer using a Sigmoid probability function, an output of the Sigmoid probability function being in a range of 0 to 1.

4. The method of claim 3, wherein in the step S6, an equation for determining a gray scale value R is:

$$R = \frac{\mu_l^*}{\mu_h^*} = \frac{\ln(I_{ol}/I_l)}{\ln(I_{ol}/I_h)},$$

where $\mu_l^*$ denotes a mass absorption coefficient of a low-energy region;
$\mu_h^*$ denotes a mass absorption coefficient of a high-energy region;
$I_{ol}$ denotes an intensity of the low-energy region before the X-ray transmits an object;
$I_{oh}$ denotes an intensity of the high-energy region before the X-ray transmits the object;
$I_l$ denotes an intensity of the low-energy region before the X-ray transmits the object; and
$I_h$ denotes an intensity of the high-energy region after the X-ray transmits the object.

5. The method of claim 1, wherein the step S7 includes:
a, obtaining a target sample, the target sample including ten pieces of coal and ten pieces of gangue of each granularity level in a range of 10 mm-30 mm and a gradient of variation of 2 mm;
b, determining a gray scale value of an image of the target sample, establishing the database, and obtaining the separation threshold of coal and gangue of the each granularity level of the current mining area by performing statistics; and
c, feeding back a gray scale value of sorted coal and gangue to the database in the step b in real time in a sorting process, updating the database continuously, and deleting data of previous Z hours.

6. The method of claim 5, wherein the Z is 10.

7. The method of claim 5, further comprising:
determining deviation data based on a current gray scale feature set and candidate historical data before a candidate time period;
in response to the deviation data satisfying a preset deviation condition, determining the candidate time period as a target time period; and
determining the Z based on the target time period.

8. The method of claim 7, wherein the Z is related to a storage proportion, a storage speed, and a storage volume of the storage space, and the method further comprises:
in response to the storage proportion satisfying a storage proportion condition, determining a storage margin time based on the storage proportion, the storage speed, and the storage volume; and
determining the Z based on the storage margin time, a preset value, and the preset time period.

* * * * *